(12) United States Patent
Gregory

(10) Patent No.: US 10,631,621 B2
(45) Date of Patent: Apr. 28, 2020

(54) WEARABLE ASSEMBLY FOR TRANSPORTING ARTICLES WHILE ENGAGED IN SPORTS

(71) Applicant: Surf Stash, LLC, Sanford, FL (US)

(72) Inventor: Michael Gregory, Sanford, FL (US)

(73) Assignee: Surf Stash, LLC, Sanford, FL (US)

( * ) Notice: Subject to any disclaimer, the term of this patent is extended or adjusted under 35 U.S.C. 154(b) by 0 days.

(21) Appl. No.: 16/163,047

(22) Filed: Oct. 17, 2018

(65) Prior Publication Data

US 2019/0116966 A1 Apr. 25, 2019

Related U.S. Application Data

(60) Provisional application No. 62/574,318, filed on Oct. 19, 2017, provisional application No. 62/713,209, filed on Aug. 1, 2018.

(51) Int. Cl.
*A45F 5/02* (2006.01)
*F16M 13/04* (2006.01)
(Continued)

(52) U.S. Cl.
CPC .......... *A45F 5/021* (2013.01); *A44B 18/0073* (2013.01); *A45F 5/00* (2013.01); *F16M 11/041* (2013.01); *F16M 13/04* (2013.01); *A45F 2005/008* (2013.01); *A45F 2200/0516* (2013.01); *A45F 2200/0533* (2013.01); *A45F 2200/0583* (2013.01); *G03B 17/561* (2013.01)

(58) Field of Classification Search
CPC ................ A45F 5/021; A45F 2005/008; A45F 2005/026; A45F 2200/0516; A45F 2200/0533; F16M 11/041; F16M 13/04; G03B 17/561

USPC ........ 224/665, 197, 199, 935, 420, 431, 547
See application file for complete search history.

(56) References Cited

U.S. PATENT DOCUMENTS 1,559,270 A 10/1925 Harry
2,048,344 A 7/1936 Lawrence
(Continued)

FOREIGN PATENT DOCUMENTS

DE 434871 10/1926
JP 10033237 2/1998
(Continued)

*Primary Examiner* — Justin M Larson
(74) *Attorney, Agent, or Firm* — Christopher M. Ramsey; GrayRobinson, P.A.

(57) ABSTRACT

A first example of the object transport assembly includes a body attachment member adapted to attach to a wearer and an object attachment member adapted to attach to an object to be transported. An insert including a notch formed therein is carried on one of the body attachment member or object attachment member and forms a male portion of a dovetail joint. An insert receiving channel is carried on the other of the body attachment member or object attachment member and forms a female portion of a dovetail joint that mates with the insert. The insert receiving channel includes a pin that is biased in such a way that the pin automatically slides into the notch when the insert mates with the insert receiving channel. An actuator is operably connected to the pin and is operable to move the pin out of the notch for removal of the insert from the insert receiving channel.

19 Claims, 28 Drawing Sheets

(51) Int. Cl.
   *G03B 17/56* (2006.01)
   *F16M 11/04* (2006.01)
   *A44B 18/00* (2006.01)
   *A45F 5/00* (2006.01)

(56) References Cited

U.S. PATENT DOCUMENTS

| | | | | |
|---|---|---|---|---|
| 2,840,334 | A * | 6/1958 | Cauthen | F16M 11/041 248/187.1 |
| 4,341,331 | A | 7/1982 | McDougall | |
| 4,421,150 | A | 12/1983 | Masters | |
| 5,014,892 | A * | 5/1991 | Copeland | A45F 5/02 224/242 |
| 5,222,826 | A * | 6/1993 | Hanke | F16M 11/041 403/381 |
| 5,251,800 | A * | 10/1993 | Leenders | A45F 5/02 224/245 |
| 5,355,746 | A * | 10/1994 | Lin | B62J 11/00 224/420 |
| 5,358,110 | A * | 10/1994 | Simpson | A45C 11/38 206/316.2 |
| 5,375,749 | A * | 12/1994 | Oliva | A45F 5/02 224/242 |
| 5,620,120 | A * | 4/1997 | Tien | A45F 5/02 224/194 |
| 5,645,205 | A | 7/1997 | Kennedy | |
| 5,850,996 | A * | 12/1998 | Liang | A45F 5/02 248/221.11 |
| 6,112,961 | A | 9/2000 | Phillips | |
| 6,296,164 | B1 | 10/2001 | Russo | |
| 6,371,424 | B1 * | 4/2002 | Shaw | F16M 11/041 248/187.1 |
| 6,557,808 | B1 * | 5/2003 | Ling | B62H 5/00 224/425 |
| 6,568,574 | B2 | 5/2003 | Jones et al. | |
| 6,832,712 | B2 | 12/2004 | Turner | |
| 7,311,233 | B2 * | 12/2007 | Chen | B62J 11/00 224/425 |
| 7,576,800 | B2 * | 8/2009 | Swain | A42B 3/042 348/158 |
| D604,352 | S * | 11/2009 | Carlesso | D16/245 |
| 7,624,901 | B1 * | 12/2009 | Mozes | A45F 5/02 206/305 |
| 7,686,196 | B2 | 3/2010 | Panosian et al. | |
| 7,731,140 | B2 * | 6/2010 | Carnevali | F16M 11/041 248/221.11 |
| 7,743,540 | B2 | 6/2010 | McDermott | |
| D621,865 | S * | 8/2010 | Chidester | D16/245 |
| 8,020,821 | B2 * | 9/2011 | Chen | F16M 13/02 248/220.22 |
| 8,087,558 | B2 * | 1/2012 | Tsai | B62H 5/00 224/425 |
| 8,256,652 | B2 | 9/2012 | Murdoch et al. | |
| 8,411,199 | B2 * | 4/2013 | Corticelli | A45F 5/02 206/265 |
| 8,453,898 | B2 | 6/2013 | Ewins | |
| D686,688 | S | 7/2013 | Vinano | |
| 8,578,647 | B2 * | 11/2013 | Storch | F41C 27/00 248/187.1 |
| 8,708,583 | B2 * | 4/2014 | Chamberlayne | F16M 11/041 396/423 |
| D721,227 | S | 1/2015 | Milligan | |
| 8,931,795 | B1 * | 1/2015 | Gu | B60R 11/00 224/420 |
| 9,101,198 | B2 * | 8/2015 | Tseng | F41C 33/041 |
| D745,776 | S * | 12/2015 | Perreault | D3/215 |
| 9,232,850 | B2 | 1/2016 | Moreau et al. | |
| 9,244,337 | B2 * | 1/2016 | Weihe | G03B 17/561 |
| 9,247,787 | B2 * | 2/2016 | Dering | A45F 5/00 |
| 9,404,615 | B1 * | 8/2016 | Gonzalez | F16M 11/04 |
| 9,565,922 | B2 | 2/2017 | Cole et al. | |
| 10,021,931 | B2 * | 7/2018 | Tulley | A42B 3/042 |
| 10,308,329 | B2 * | 6/2019 | Rohrer | B63B 35/79 |
| D852,871 | S * | 7/2019 | Wilson | D16/242 |
| 10,359,148 | B2 * | 7/2019 | Lindblom | G09F 13/02 |
| 10,448,728 | B1 * | 10/2019 | Gregory | A45F 5/02 |
| 10,466,011 | B2 * | 11/2019 | Swan | A45F 5/021 |
| 2004/0182896 | A1 | 9/2004 | Ballard | |
| 2006/0011687 | A1 | 1/2006 | Wadley et al. | |
| 2006/0261107 | A1 | 11/2006 | Daniels | |
| 2008/0035690 | A1 * | 2/2008 | Hsai | B62H 5/00 224/425 |
| 2008/0302844 | A1 * | 12/2008 | Tempini | A45F 3/14 224/577 |
| 2019/0116966 | A1 * | 4/2019 | Gregory | A45F 5/021 |

FOREIGN PATENT DOCUMENTS

| | | |
|---|---|---|
| WO | 1993005676 A1 | 4/1993 |
| WO | 2007109078 A3 | 10/2008 |

\* cited by examiner

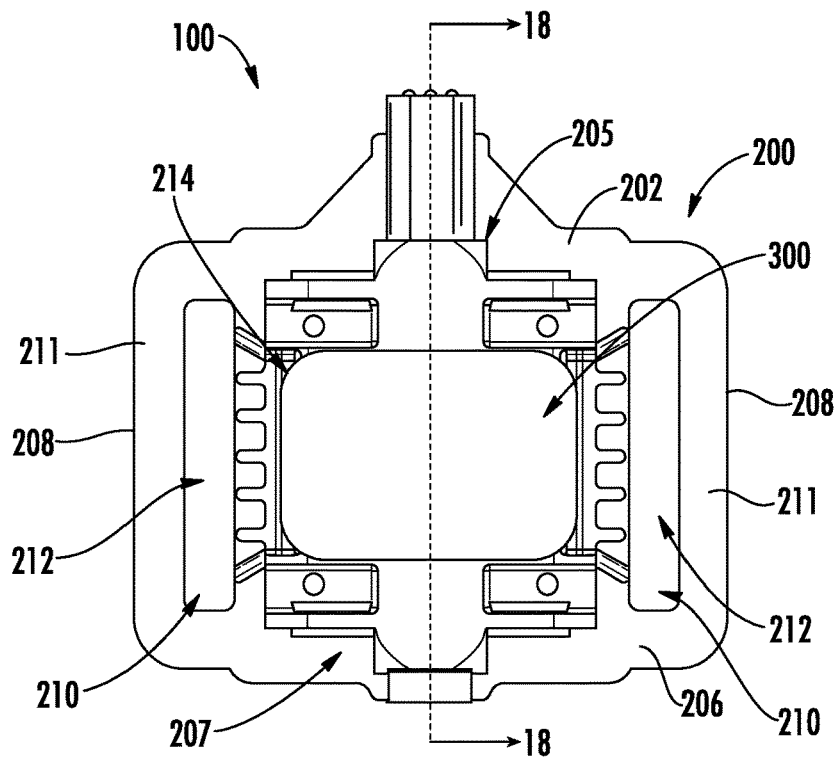
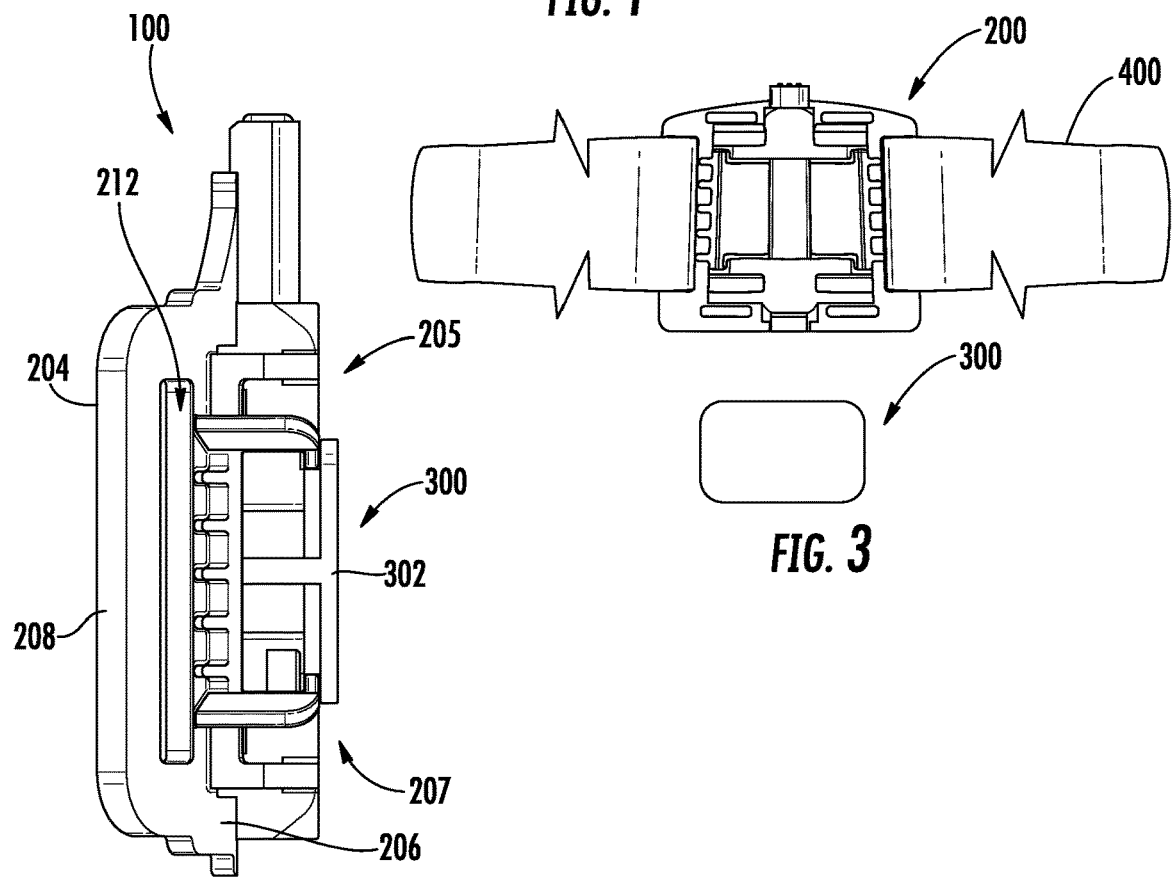
FIG. 1
FIG. 2
FIG. 3

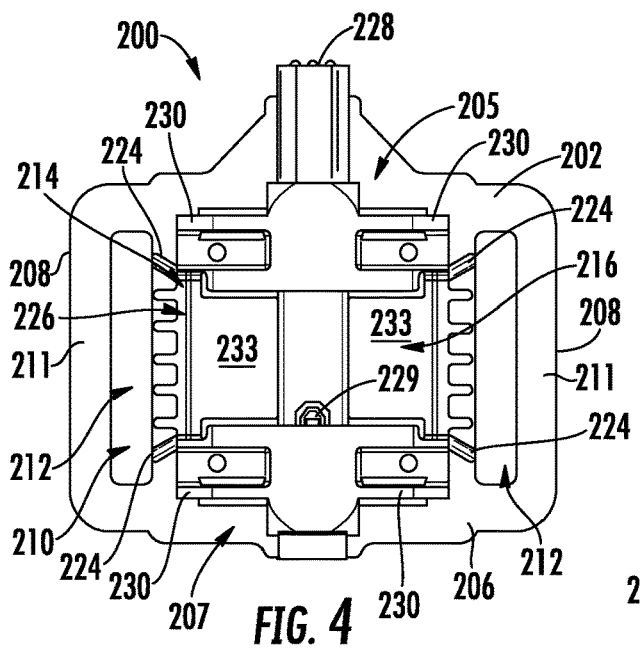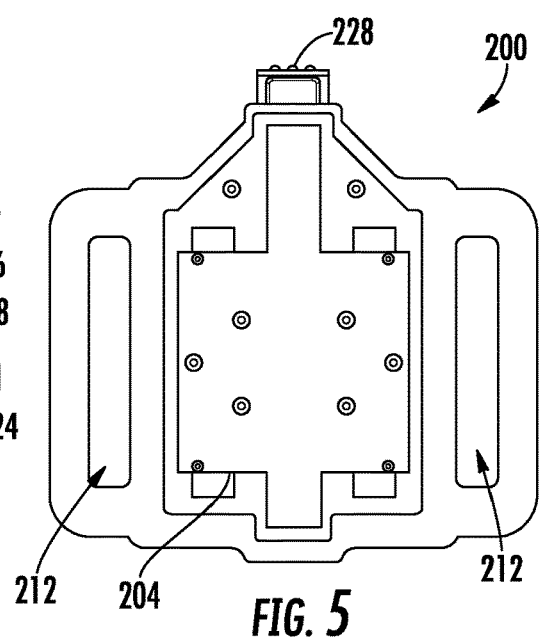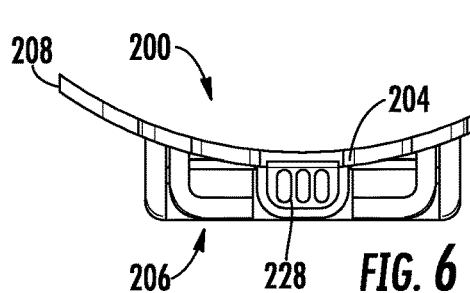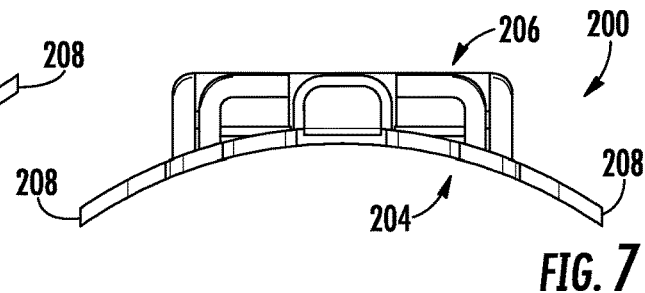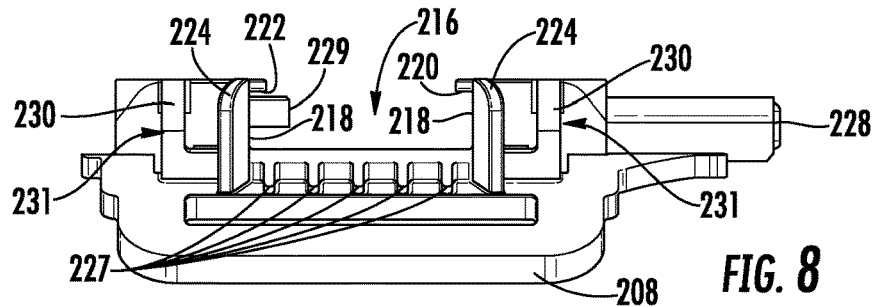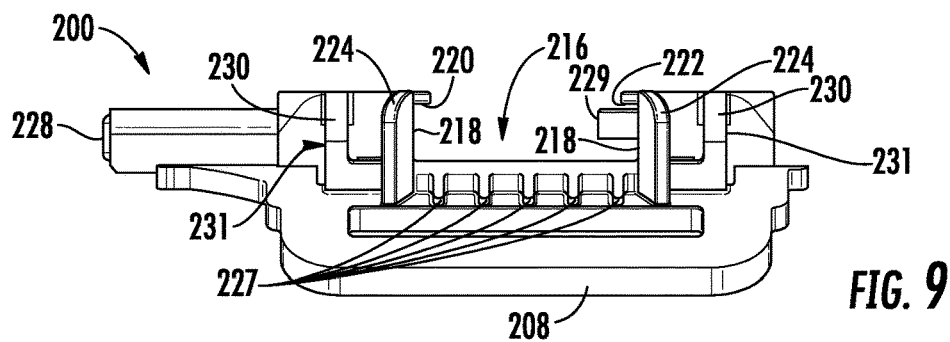

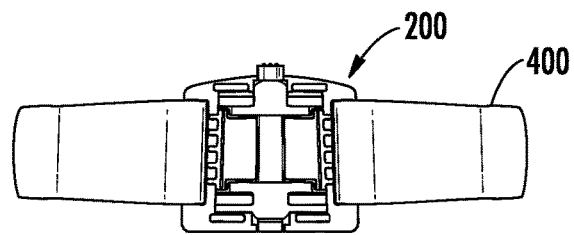
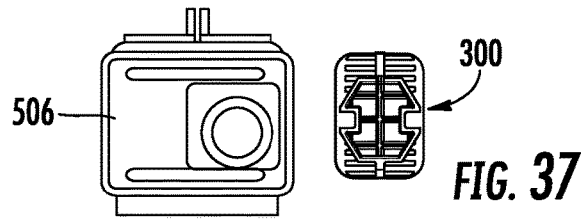
FIG. 37
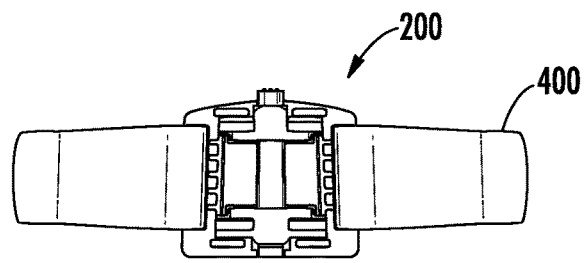
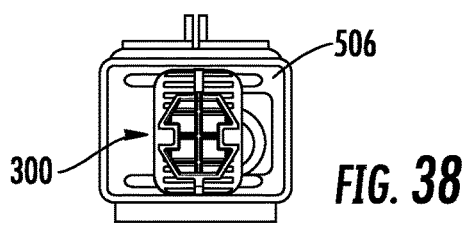
FIG. 38
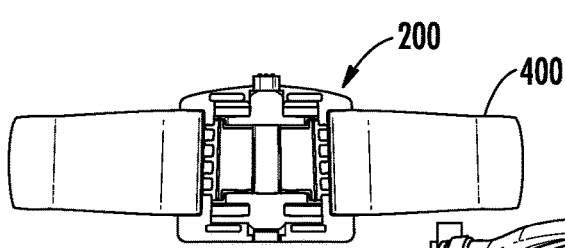
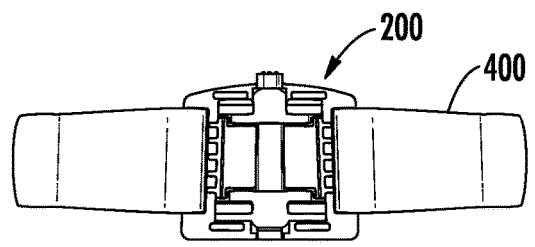
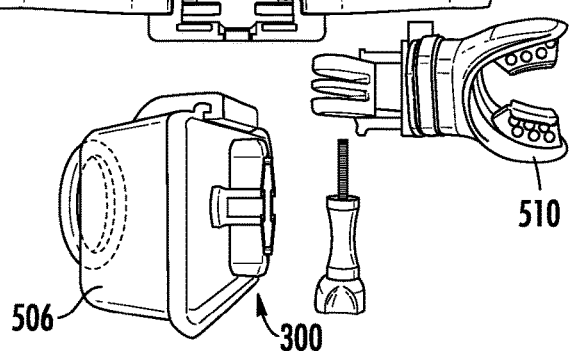
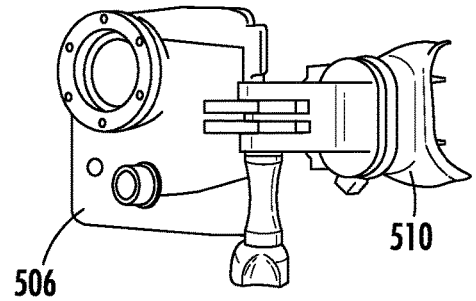
FIG. 39          FIG. 40

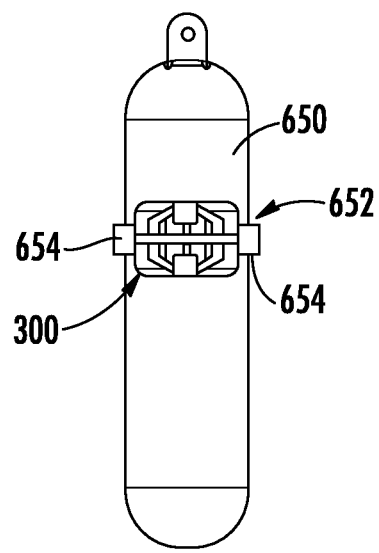 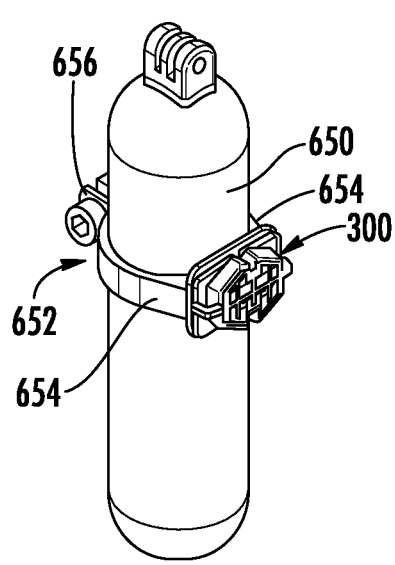 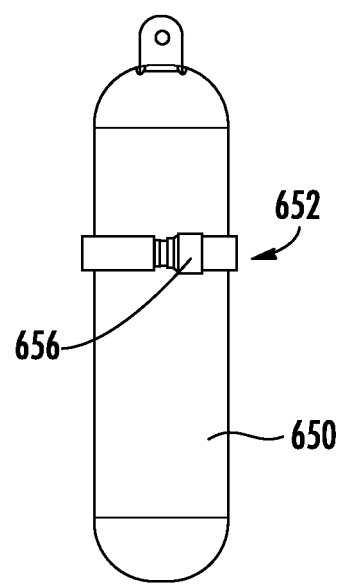
FIG. 49    FIG. 50    FIG. 51
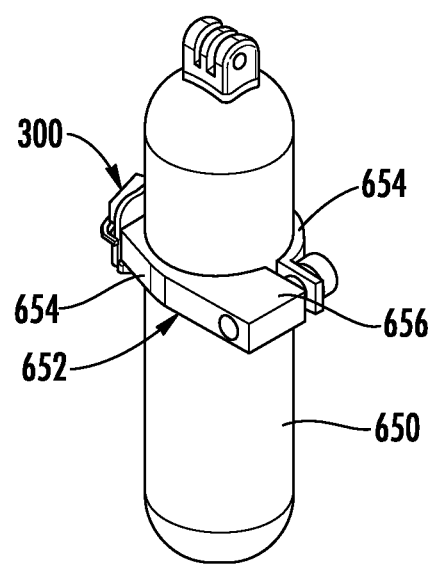 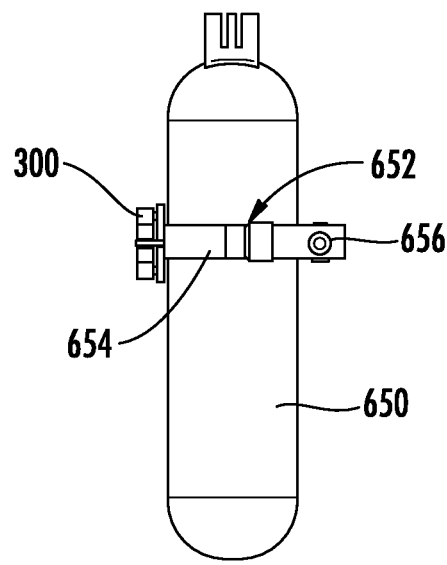
FIG. 52    FIG. 53

WEARABLE ASSEMBLY FOR TRANSPORTING ARTICLES WHILE ENGAGED IN SPORTS

CROSS-REFERENCE TO RELATED APPLICATIONS

The claims the benefit of priority from provisional Application No. 62/574,318, filed Oct. 19, 2017, and provisional Application No. 62/713,209, filed Aug. 1, 2018. The entire contents of these applications are incorporated by reference herein.

FIELD

This relates to the field of accessories used to carry items and, more particularly, to devices used to carry objects while the wearer is engaged in a sports activity.

BACKGROUND

Watersport enthusiasts often desire to carry items with them into the water that are not attached to their craft or body. For example, when surfing or paddleboarding, it may be desirable to carry along articles such as board wax, a mobile phone, a camera, or another item not attached to the board into the water. This prevents the user from needing to return all the way to shore to obtain such items. Unfortunately, conventional solutions for carrying objects in the water require the watersport enthusiast to stop the activity and use both hands to access, use, and replace the object while looking at the object, and, at times, to contort his or her body into positions not natural to the watersport.

Furthermore, certain objects, such as a camera connected to a mouthpiece mount or a hand/buoy grip, are difficult to transport. Carrying a water camera connected to a mouthpiece mount in the enthusiast's mouth or on a leash worn around the enthusiast's neck while surfing, kiteboarding or paddleboarding or transporting a camera on a hand grip, buoy grip or pole when not filming is cumbersome and uncomfortable.

Finally, certain conventional transport mechanisms require the desired object to remain connected to the transport system in a static location, which is not optimal for the watersport chosen. One such example is camera chest mount that requires the camera to film from the chest of the enthusiast when the best outcome would be to allow the enthusiast to film from the chest mount and other mounts, such as a mouth mount, during the same watersport session.

BRIEF SUMMARY

In view of the foregoing, it would be advantageous to have a wearable apparatus that allows the wearer to carry items the wearer may need while engaged in an activity, but does not require the wearer to divert his or her attention away from the activity while attaching the item to or removing the item from the apparatus. Such an apparatus in an object transport assembly.

A first example of the object transport assembly includes a body attachment member adapted to attach to a wearer and an object attachment member adapted to attach to an object to be transported. An insert including a notch formed therein is carried on one of the body attachment member or object attachment member and forms a male portion of a dovetail joint. An insert receiving channel is carried on the other of the body attachment member or object attachment member and forms a female portion of a dovetail joint that mates with the insert. The insert receiving channel includes a pin that is biased in such a way that the pin automatically slides into the notch when the insert mates with the insert receiving channel. An actuator is operably connected to the pin and is operable to move the pin out of the notch for removal of the insert from the insert receiving channel.

A second example of the object transport assembly includes an object attachment member adapted to attach to an object to be transported, the object attachment member carrying an insert that forms a male portion of a dovetail joint, the insert including a notch formed therein. It also includes a body attachment member adapted to attach to a wearer, the body attachment member carrying an insert receiving channel that forms a female portion of a dovetail joint that mates with the insert, the insert receiving channel including a pin that is biased in such a way that the pin automatically slides into the notch when the insert mates with the insert receiving channel. An actuator is operably connected to the pin and carried by the body attachment member. The actuator is operable to move the pin out of the notch for removal of the insert from the insert receiving channel.

In a method of use example, the object transport assembly may be worn while performing a watersport in a body of water.

Some examples of additional features that may be included on the body attachment member or the object attachment member may include any of those now described.

The insert receiving channel may have a pair of opposed channel mouths through which the insert is receivable into the insert receiving channel. The channel mouths may include channel guides that extend out of the insert receiving channel at the respective channel mouths and angle outwardly relative to channel walls forming the boundaries of the insert receiving channel to increase the internal distance between the channel walls at the channel mouths.

The insert may include opposed insert walls extending from a central section to opposed insert ends. The insert walls may taper inwardly toward the insert ends in such a way that a width of the insert at the insert ends is less than the width at the central section.

The body attachment member may be adapted to attach to the wearer with a strap adapted to attach to an appendage of the wearer.

The object attachment member may include a mouthpiece.

The object attachment member may include at least one arm that connects a cylindrical object thereto

BRIEF DESCRIPTION OF THE DRAWINGS

FIG. 1 is a front view of a first example of the transport assembly.

FIG. 2 is a side view thereof.

FIG. 3 is a front view of a transport assembly attached to a strap.

FIG. 4 is a front view of a first example of a body attachment member.

FIG. 5 is a back view thereof.

FIG. 6 is a top view thereof.

FIG. 7 is a bottom view thereof.

FIG. 8 is a side view thereof.

FIG. 9 is a side view thereof from the opposite side as FIG. 8.

FIG. 37 depicts a transport assembly ready for attachment to a camera housing.

FIG. 38 depicts the transport assembly of FIG. 37 with the object attachment member on the camera housing.

FIG. 39 depicts a transport assembly with the object attachment member on the camera housing and mouthpiece ready to be attached.

FIG. 40 depicts the transport assembly of FIG. 39 with the mouthpiece attached.

FIG. 49 is a back view of a third example of an object attachment member attached to a cylindrical object.

FIG. 50 is a side perspective view thereof.

FIG. 51 is a front view thereof.

FIG. 52 is another side perspective view thereof.

FIG. 53 is a side view thereof.

DETAILED DESCRIPTION OF EXAMPLE EMBODIMENTS

Figure 10:
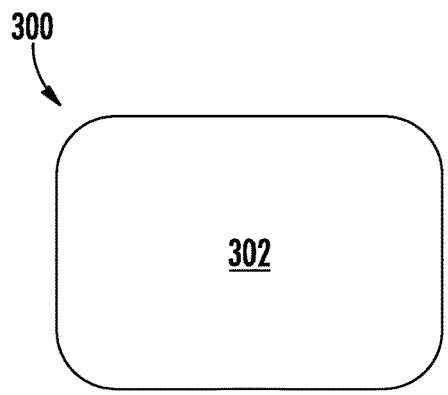
FIG. 10 is a front view of a first example of an object attachment member.
Figure 11:
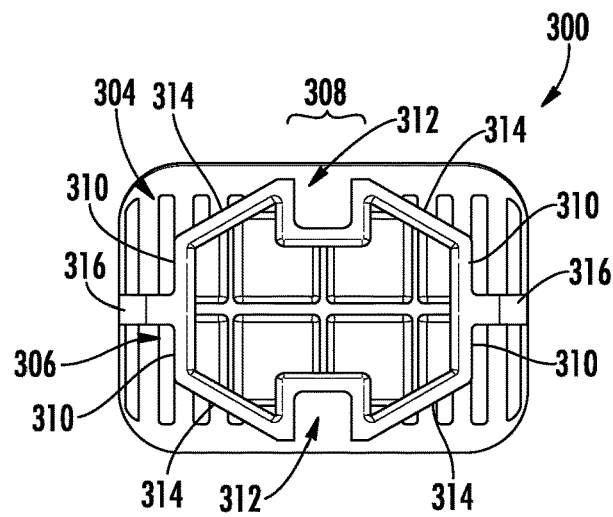
FIG. 11 is a back view thereof.
Figure 12:
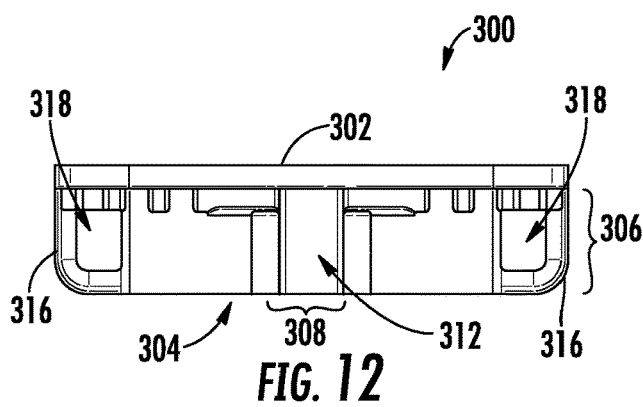
FIG. 12 is a top view thereof.
Figure 13:
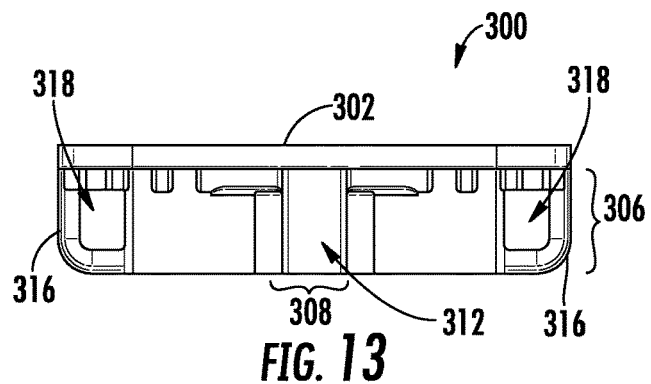
FIG. 13 is a bottom view thereof.
Figure 14:
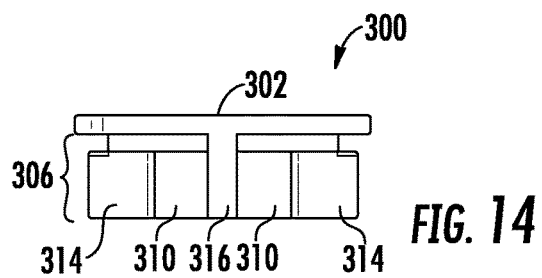
FIG. 14 is a side view thereof.
Figure 15:
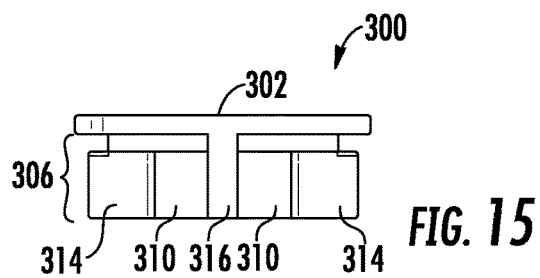
FIG. 15 is a side view thereof from the opposite side as FIG. 14.

A first example of the transport assembly is now discussed by referring to FIGS. 1-3. The transport assembly 100 includes a body attachment member 200 adapted to be attached to a person's body via a belt or the clothing and an object attachment member 300 adapted to be attached to an object the wearer wants to carry on his or her person. The object attachment member 300 is removably attachable to the body attachment member 200.

The body attachment member 200 has a body 202 with a back side 204, a front side 206 opposite the back side 204, a top end 205, a bottom end 207, and opposed lateral ends 208.

The body attachment member 200 includes a strap attachment mechanism 210. In this first example, the strap attachment mechanism 210 includes a pair of elongated strap receiving openings 212 through which a strap 400 worn by the wearer, such as a belt or the like, may be inserted. The strap receiving openings 212 are respectively positioned adjacent the lateral end 208. The strap receiving openings 212 are vertically elongated for receiving a strap therethrough. The strap receiving openings 212 may be horizontally elongated in other examples. The strap receiving openings 212 may also vary in size depending upon the width of the strap to be inserted in the openings.

The strap 400 is attachable to one of a person's appendages. The strap 400 may be, for example, an arm band, wrist band, leg band, or the like. In certain particular examples, the strap 400 may be a cuff of a surfboard leash or a standup paddleboard leash, a strap attached to the wearer's clothing, or a strap on a backpack or other article carried by the wearer. The strap 400 is attached to the transport assembly 100 by inserting a loose end of the strap 400 through the strap receiving openings 212. The strap 400 may include touch fastener such as hook and loop fastener material such as VELCRO or the like on one or both sides for securing the strap 400 around the wearer's appendage.

Additional details of body attachment member 200 are now discussed by referring also to FIGS. 4-9. The front side 206 of the body 202 includes a clip member 214 that protrudes from the front side 206 of the body 202 and defines a insert receiving channel 216 for receiving at least a portion of the object attachment member 300 therein.

The insert receiving channel 216 includes opposed insert receiving channel walls 218 defining the outer perimeter of the insert receiving channel 216. The insert receiving channel 216 forms the female portion of a dovetail joint. A first lip 220 and a second lip 222 extend over the channel 216 from the respective insert receiving channel wall 218.

Channel guides 224 extend laterally out of the channel 216 and protrude from the body 202 at respective channel mouths 226. Each channel guide 224 is angled outwardly relative to the channel walls 218 to increase the internal distance between the channel walls 216 at the channel mouths 226. A channel ramp 227 is placed at the entrance of both channel mouths 226 to better facilitate entry of the object attachment member 300 into the channel 216. Each channel ramp 227 forms a planar surface that angles upward or ramps from the front side 206 to a channel back wall 233. The channel ramps may be formed as individual fingers that form a ramp when combined or may be formed as a continuous ramp surface.

An actuator is 228 is positioned adjacent the channel 216. The actuator 228 is operably connected to a pin 229 positioned within the channel 216. Additional details of this feature are discussed later.

The body attachment member 200 also includes at least one tether attachment point 230 which is adapted to be attached to a tether 320. The tether attachment point may be a hole 231 defined by the body attachment member 200.

Additional details of the object attachment member are now described by referring to FIGS. 10-15.

The object attachment member 300 includes an object attachment surface 302 opposite a back side 304 from which an insert 306 protrudes. The insert 306 is mateable with the insert receiving channel 216. The insert 306 forms a male portion of a dovetail joint that is adapted to cooperatively mate with the clip member 214 when inserted into the insert receiving channel 216.

The object attachment surface 302 is adapted for attachment to an object to be carried. In this example, the object attachment surface 302 is substantially planar so that it can be attached to the object with adhesive, touch fasteners, or any number of conventional attachment mechanisms for joining together two surfaces. In other examples, the object attachment surface 302 may integrally formed with the object as a single piece. In such cases, the object attachment member 300 is molded or otherwise constructed into the object directly.

The insert 306 extends from a central section 308 to opposed insert ends 310 in a symmetrical fashion. The central section includes a notch 312 formed therein for receiving the pin 229 when the object attachment member 300 and body attachment member 200 are joined. On either side of the notch 312, the insert walls 314 taper inwardly such that the distance between the insert walls 314 at the insert ends 310 is less than the distance at the central section 308.

The object attachment member 300 also includes another tether attachment member 316. In this example, the tether attachment member 316 includes a pair of holes 318 formed as part of the insert 306 adjacent the insert ends 310.

Figure 16:
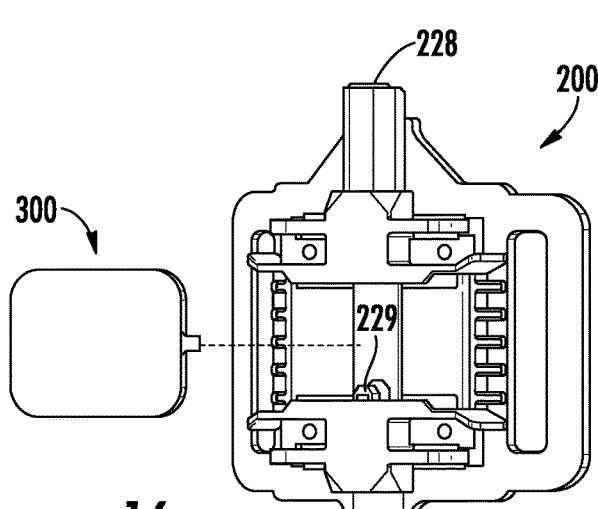
FIG. 16 is a front perspective view of the transport assembly of FIG. 1 illustrating how the object attachment member and body attachment member may be connected from one side.
Figure 17:
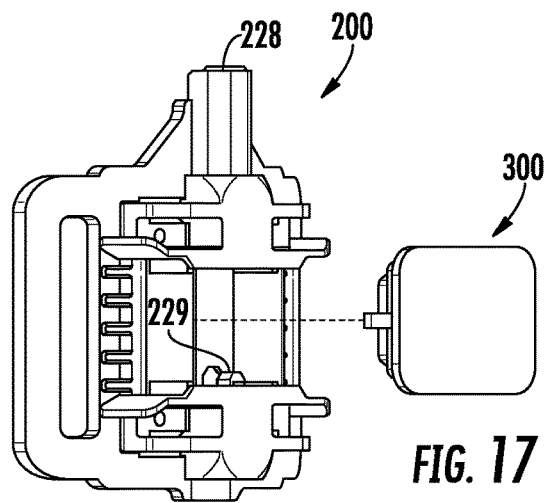
FIG. 17 is a front perspective view of the transport assembly of FIG. 16 illustrating how the object attachment member and body attachment member may be connected from the opposite side as FIG. 16.
Figure 18:
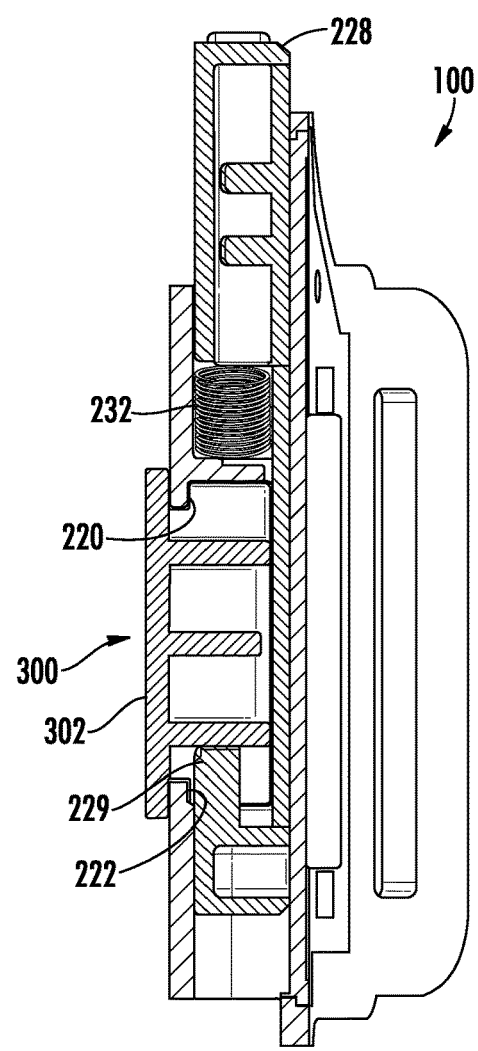
FIG. 18 is cutaway view taken along plane 18-18 from FIG. 1 illustrating how the object attachment member and body attachment member mate.

Referring to FIGS. 16-18, a description of how the body attachment member 200 and object attachment member may be connected is now described.

The object attachment member 300 is adapted to be insertable into the insert receiving channel 216 of the body attachment member 200 from either direction. To achieve this, opposed the insert ends 308 of the object attachment member 300 are tapered as described above. This construction allows the transport assembly 100 to operate in the same manner whether the user wears the transport assembly on the left or right side of the body, such that the user may easily depress the actuator 228 with his or her thumb or index finger, for example, while grasping the object being transported with his or her remaining fingers to disconnect the object attachment member 300 with one hand and without looking if desired.

The tapered shape of the insert 306 acts as a guide that helps the insert 306 slide into the proper position. When, for example, one of the tapered insert walls 314 contacts a channel guide 224 the angle of the channel guide 224 and taper of the insert wall 314 will allow direct the insert into the channel 216. This is especially advantageous when the user is engaged in an activity and cannot look to ensure the user has positioned the object attachment member 300 at the exact correct position to attach it to the body attachment member 200.

The cutaway view of FIG. 18 is used to explain how the object attachment member 300 and body attachment member 200 are connected together.

When the object attachment member 300 is not attached to the body attachment member 200, the pin 230 is biased outwardly with a spring 232 within the body attachment member 200. When the insert 306 is inserted into the channel 216 one of the tapered insert walls 314 presses down the pin 229 which is biased by the spring 232. The pin 229 then slides into the notch 312, which locks the object attachment member 300 in place.

When the actuator 228 is pressed, the pin 229 moves downward. The height of the actuator 228 may vary depending upon the application. In addition, the actuator 228 and pin 229 may reside horizontally or diagonally in other applications depending upon the location of the body attachment member 200.

The number of notches 312 on the object attachment member 300 may depend on the functionality desired for the object to be transported and the activity chosen. When the object attachment member 300 includes two notches 312 on opposite sides of the insert 306, the transport assembly 100 may be used in the same manner by the user whether the transport assembly is worn on the left or right side of the body depending on the dominant hand of the wearer and/or specific equipment or clothing necessitated by the activity chosen.

To remove the object attachment member 300 from the body attachment member 200, the user may press the actuator 228, which moves the pin 229 out of the notch 312, via the spring-biased mechanism, thereby allowing the user to slide the insert 306 out of the channel 216. Advantageously, the user does not need to engage the actuator 228 when inserting the insert 306 into the channel 216, as such engagement happens automatically via the spring-biased mechanism.

It is to be understood that in all examples of the transport assembly it is not necessary for the channel 216 to be horizontally oriented. It may also be vertically oriented if desired for the particular object to be carried or activity to be performed.

Figure 19:
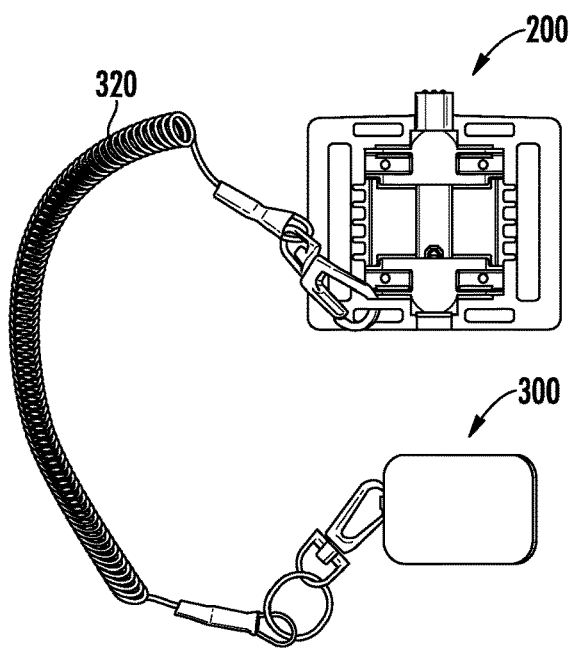
FIG. 19 is a front view of a transport assembly with a tether attaching the body attachment member to the object attachment member.

Referring to FIG. 19, a transport assembly 100 is shown with a tether 320 having it opposed ends attached to a tether attachment point 230 on the body attachment member 200 and a tether attachment point 316 on the object attachment member 300. The tether 320, in this example, is a resilient band that connects the body attachment member 200 to the object attachment member 300. The tether 320 is a safety mechanism that prevent the object being carried on the object attachment member 300 from being dropped and lost, which is a major risk in watersports.

Figure 20:
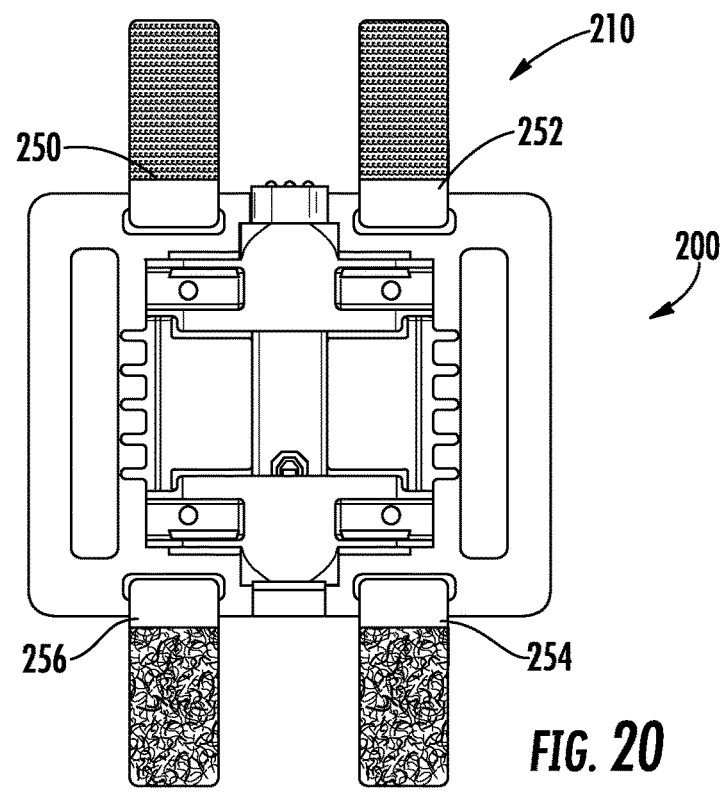
FIG. 20 is a front view of a second example of a body attachment member.
Figure 21:
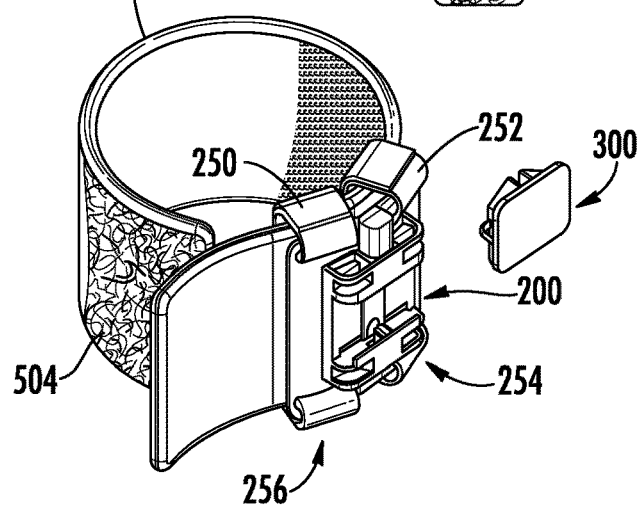
FIG. 21 is a front perspective view thereof attached to a strap.
Figure 22:
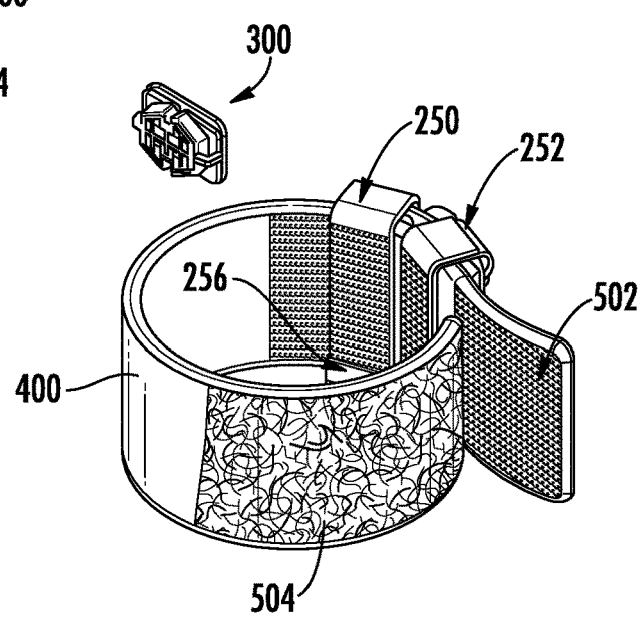
FIG. 22 is a back perspective view thereof attached to a strap.

Referring to FIGS. 20-22, a different example of the body attachment member 200 using an additional strap attachment mechanism is shown. This additional strap attachment mechanism may be used as the primary mechanism to secure the body attachment member 200 to the strap 400, or it may be used as a second strap attachment mechanism in addition to the strap attachment mechanism 210 illustrated in FIG. 1 in order to better secure the transport assembly 100 to the strap 400. The strap attachment mechanism 210 in this example includes a first band 250 and a second band 252 that wrap around the strap 400 from one end and a third band 254 and fourth band 256 that wrap around the same side of the strap 400 from the other end. A first end of the first and second band 250, 252 is affixed to one side of the body attachment member 200 and the second end of the first and second band 250, 252 is not affixed to the body attachment member 200. A first end of the third and fourth band 254, 256 is affixed to the side of the body attachment member 200 opposite to where the first end of the first and second band 250,252 are affixed to the body attachment member 200, and the second end of the third and fourth band 254,256 is not affixed to the body attachment member 200.

The inside of the first and second bands 250,252, may include touch fastener material such as a hook or loop portion of a hook an loop fastener so that it adheres to the touch fastener material 502 on the inside of the first end of the strap 400. The outside of the first and second band 250,252 may include touch fastener material so that it connects to the touch fastener material 504 on the outside of the second end of the strap 400 when the strap 400 is secured around the wearer's appendage.

The third and fourth bands 254, 256 may also use a touch fastener system in the same manner as the first and second bands 250,252, except that the touch fastener material on the inside of the second end of the third and fourth bands 255, 256 overlays the touch fastener material 502 on the outside of the second end of the first and second band 250,252, thereby securing the body attachment member 200 to the strap 400. This configuration using touch fastener material on the outside of the first through fourth bands 250,252,254, 256 is important for safety reasons in certain examples, as this configuration ensures no loss of loop touch fastener surface area on the inside of the first end of the strap 400 onto which to attach the touch fastener material 504 on the outside of the second end of the strap 400 when the strap 400 is secured around the wearer's appendage, thereby ensuring that the strap 400 stays locked around the wearer's appendage.

Yet another example of a strap attachment mechanism may include affixing the body attachment member 200 directly to the strap 400 such that it is integral with the strap 400.

Figure 23:
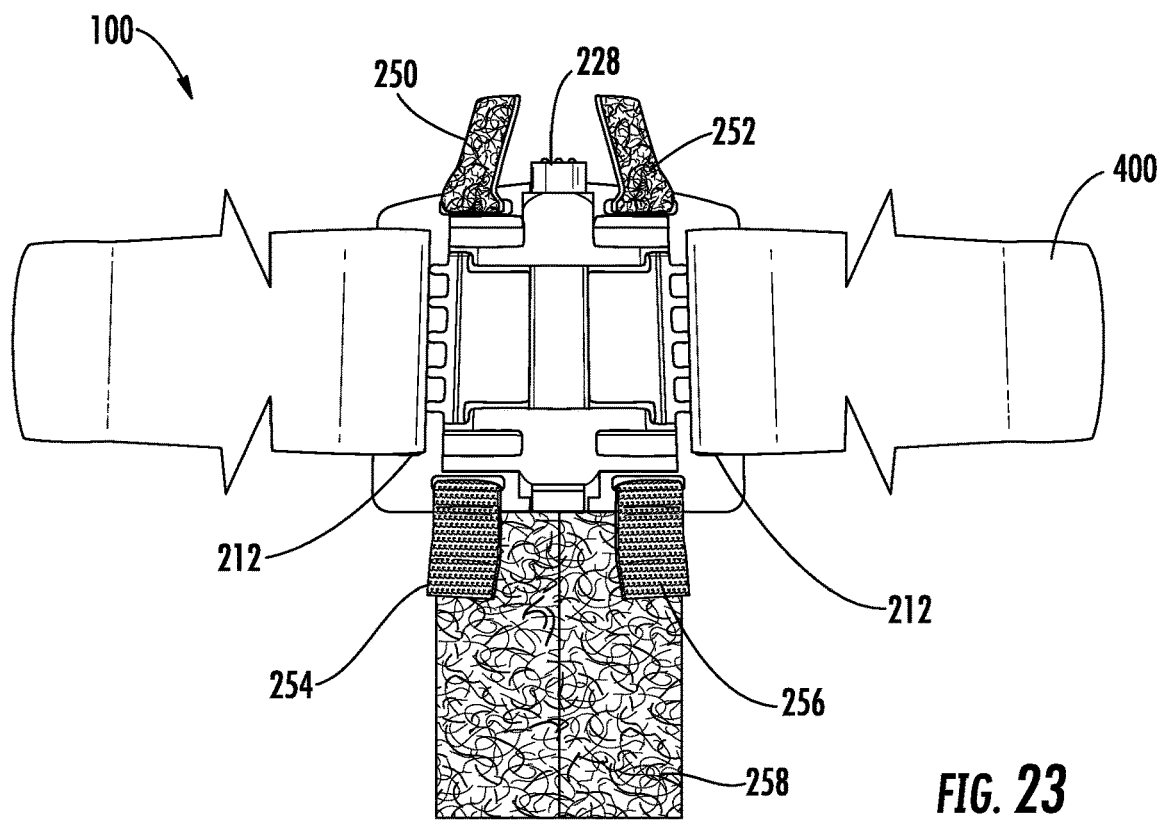
FIG. 23 is a front view of a third example of a body attachment member.
Figure 24:
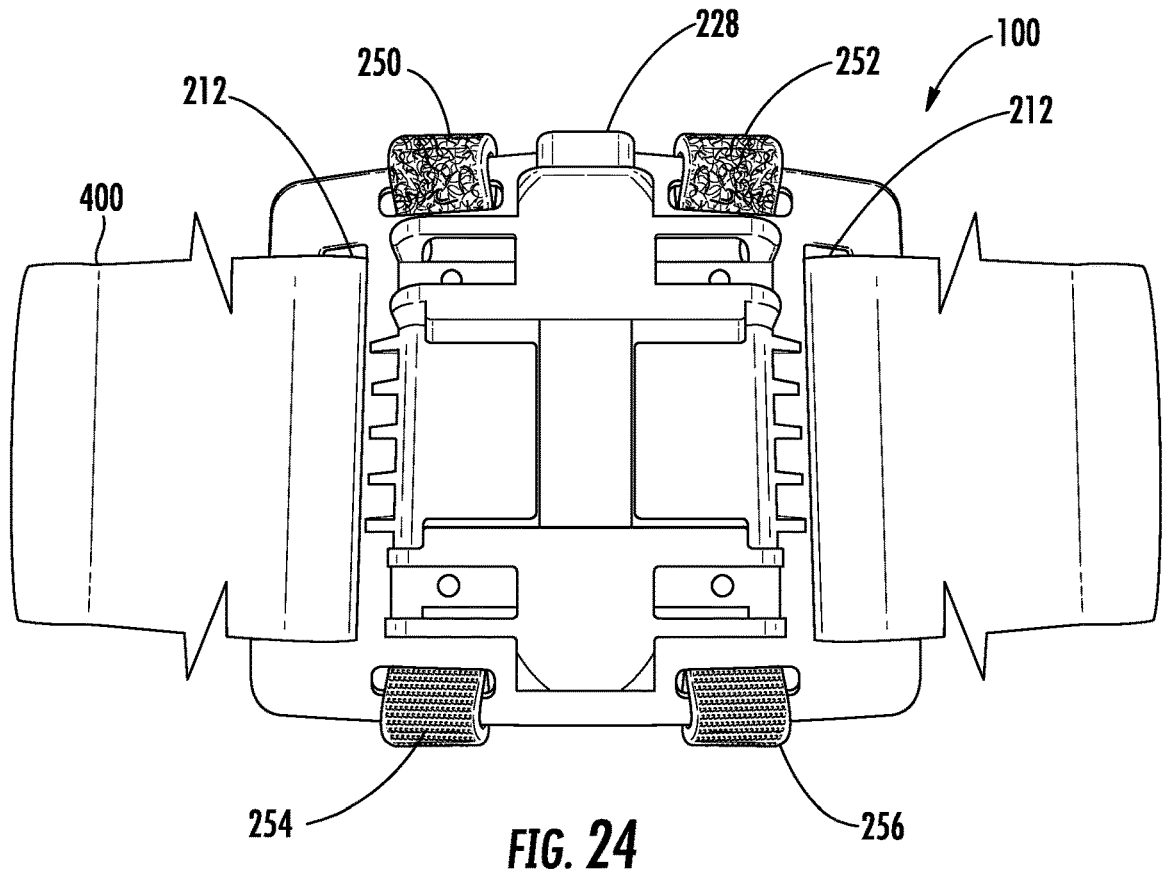
FIG. 24 is a front view thereof attached to a strap.

Referring to FIGS. 23 and 24, another example of a strap attachment mechanism used in more strenuous activities and watersports uses a combination of the strap attachment mechanism 210 described in connection with FIGS. 1-3 and the touch fastener system described in connection with FIGS. 20-22 but with an additional band 258 to further secure the body attachment member 200 to the strap 400.

Figure 25:
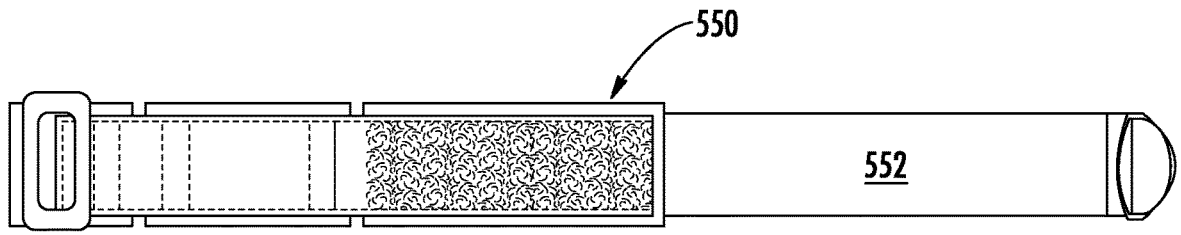
FIG. 25 is a front view of an example of a strap that may be used.
Figure 26:
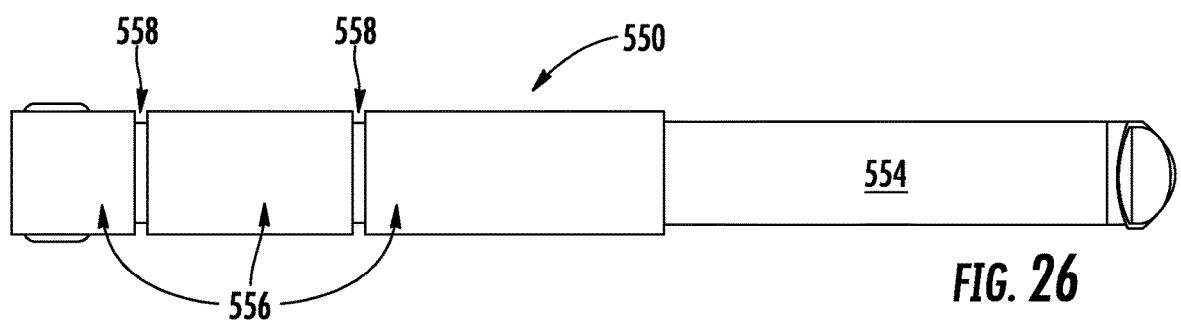
FIG. 26 is a back view thereof.
Figure 27:
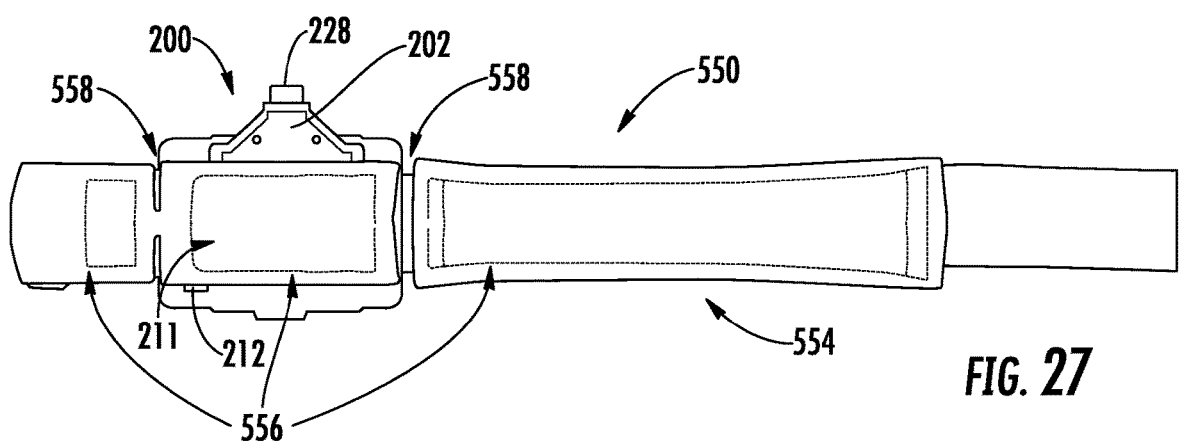
FIG. 27 is a back view thereof with a transport assembly attached.

Referring to FIGS. 25-27, an example of a modified strap 550 designed to carry the body attachment member 200 includes a front side 552 similar to a typical arm or leg band, but where the back side 554 has been modified to include three components 556 made of neoprene, lycra or similar material that reside against wearer's body and that are connected to standard strap material. These three components 556 are separated by two grooves 558, whereby the portion of the body attachment member 200 body 202 including the outermost edge of the strap receiving openings 212 to the outermost section 211 of the body 202 may reside in the two grooves 558 under the middle of the three components 556 and the strap material. In this manner, no portion of the body attachment member 200 touches the wearer's body for purposes of comfort. The location of these grooves 558 also acts to instruct the wearer as to the best location to place the body attachment member 200 on the strap 550.

Figure 28:
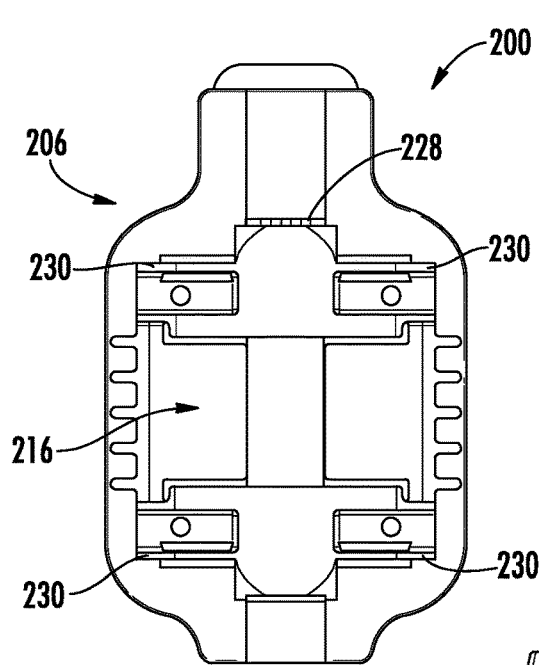
FIG. 28 is a front view of a fourth example of a body attachment member.
Figure 29:
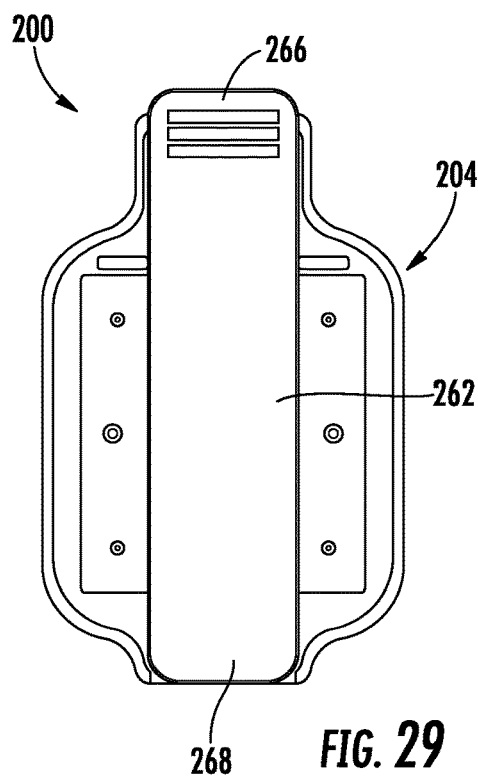
FIG. 29 is a back view thereof.
Figure 30:
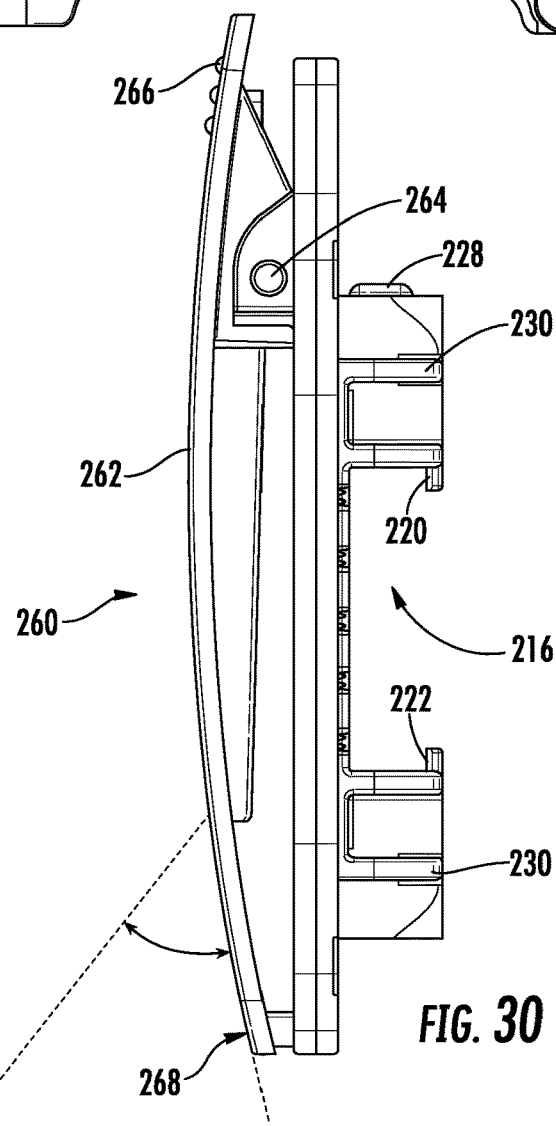
FIG. 30 is a side view thereof. The opposite side is a mirror image.

Referring to FIGS. 28-30, a fourth example of the body attachment member 200 is depicted and includes a clip attachment 260 including a clip arm 262 that is pivotable about a clip hinge 264. The clip hinge 264 is biased in the closed position. When an upper end 266 of the clip arm 262 is pressed toward the body attachment member 200, the lower end 268 opens, as illustrated by the arrow in FIG. 30. When the pressure is removed, the lower end 268 recloses. The clip attachment 260 may be attached to clothing, a belt, or other article worn by a wearer.

There are many different types of objects that the transport assembly 100 may be used to carry for watersports or other activities. Such objects may include pouches, mobile phone cases, bottles, cameras, camera accessories, and equipment used in watersport such as flashlights, knives, buoy grips, and spear guns, among many other possibilities. A few of the possible examples are now discussed in more detail.

Figure 31:
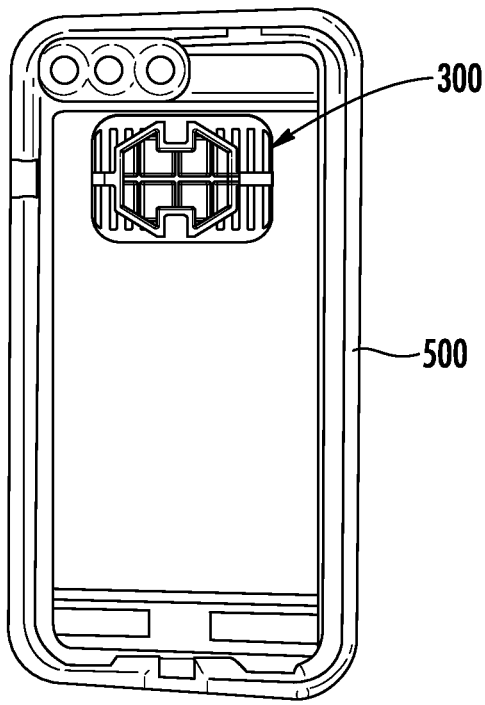
FIG. 31 is a back view of a mobile phone case with an object attachment member thereon.
Figure 32:
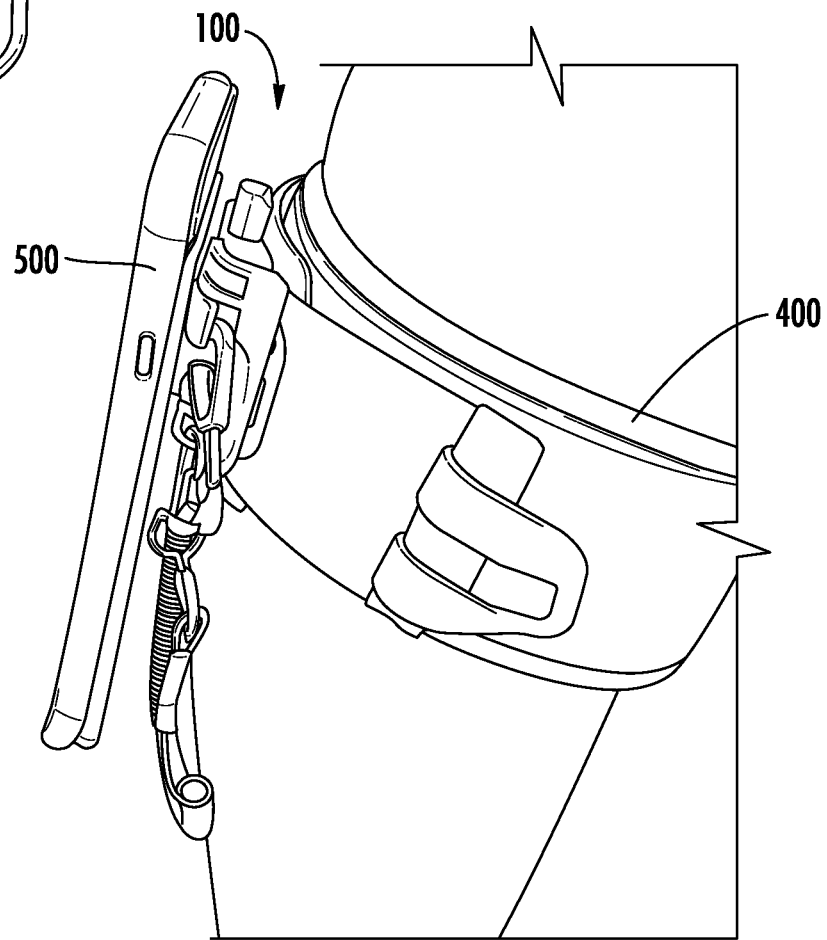
FIG. 32 depicts the mobile phone case worn on a wearer's appendage with a strap connected to the transport assembly.

Referring to FIGS. 31 and 32, the object attachment member 300 is attached to the back side of a mobile phone case 500 that may be waterproof. This allows the wearer to carry the wearer's phone by strapping the strap 400 to the wearer's appendage A and joining the object attachment member 300 with the body attachment member 200.

Figure 33:
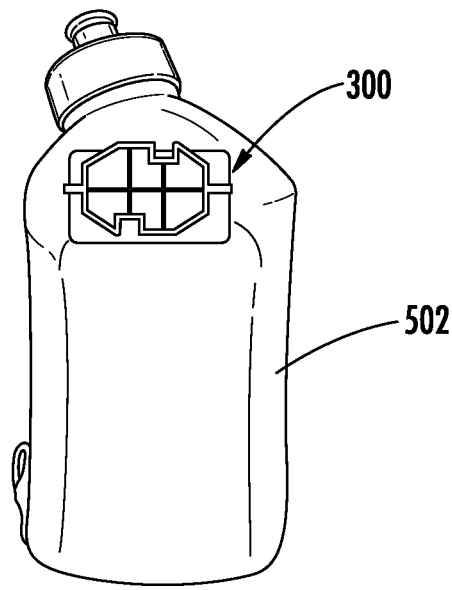
FIG. 33 is a back view of a bottle with an object attachment member thereon.
Figure 34:
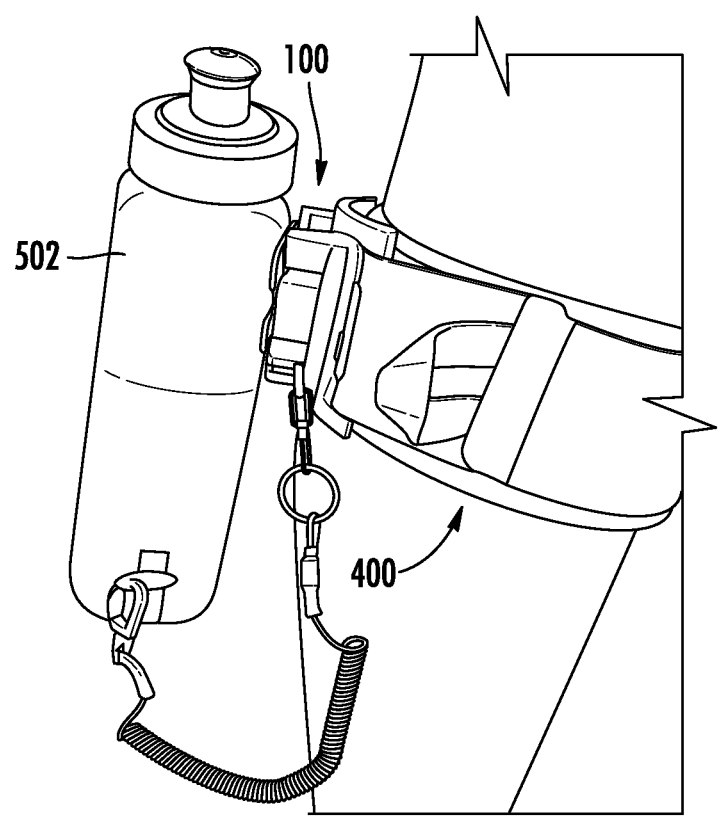
FIG. 34 depicts the bottle worn on a wearer's appendage with a strap connected to the transport assembly.

Referring to FIGS. 33 and 34, the object attachment member 300 is attached to the back side of a bottle 502 and is being carried on the wearer's appendage A.

Figure 35:
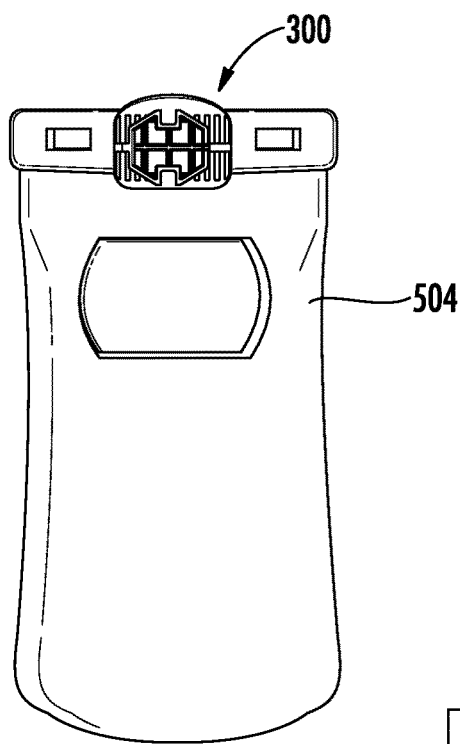
FIG. 35 is a back view of a pouch with an object attachment member thereon.
Figure 36:
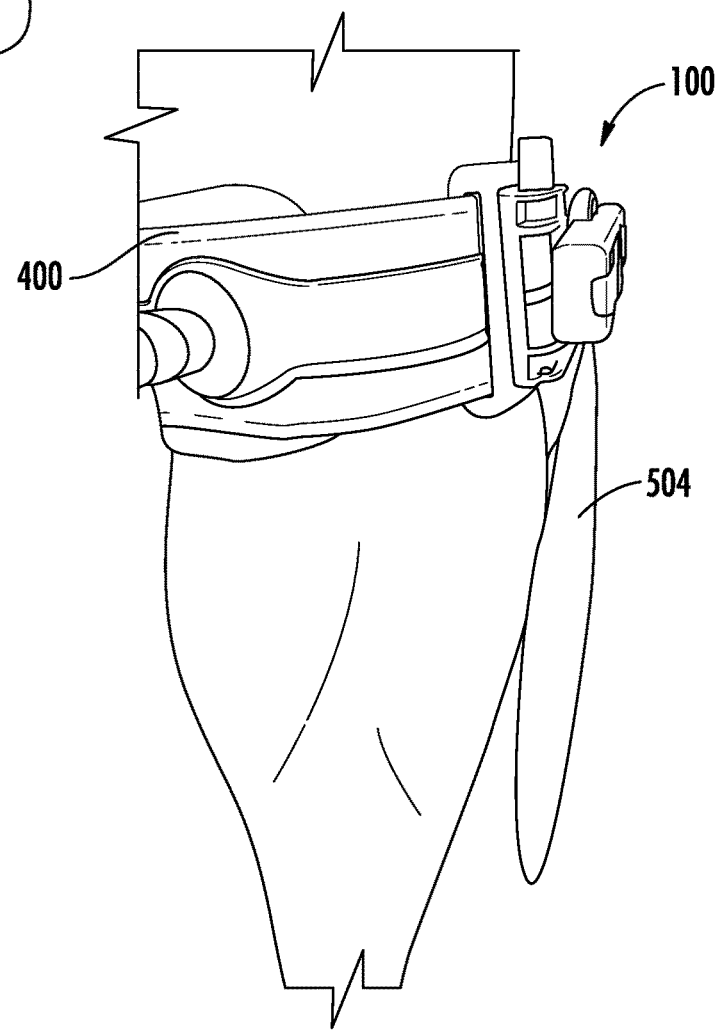
FIG. 36 depicts the pouch worn on a wearer's appendage with a strap connected to the transport assembly.
Figure 42:
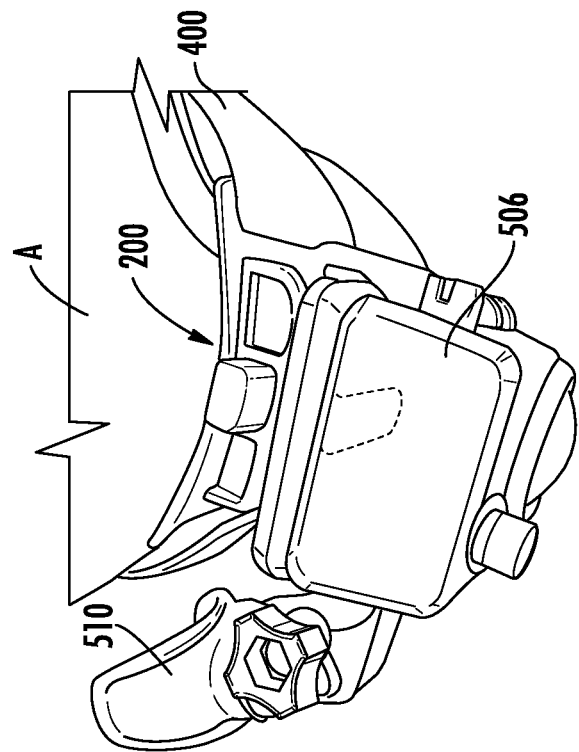
FIG. 42 depicts the transport assembly of FIG. 41 being worn on a wearer's appendage from the top.
Figure 41:
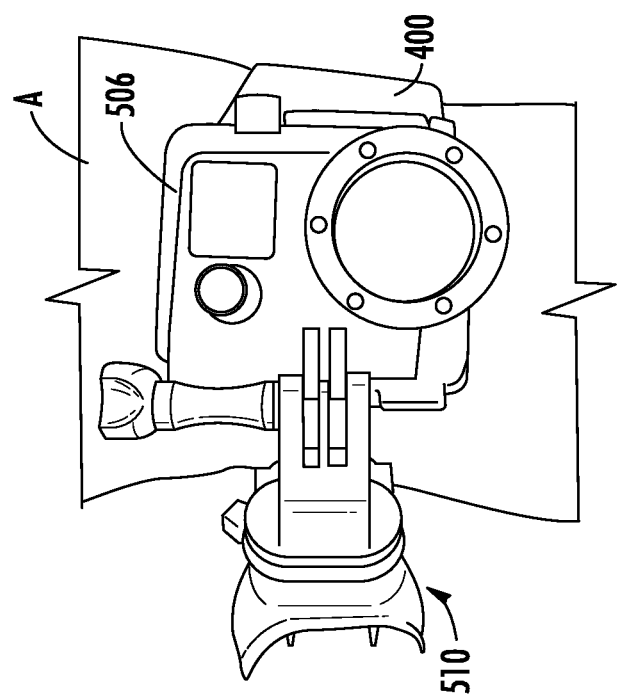
FIG. 41 depicts the transport assembly of FIGS. 39 and 40 being worn on a wearer's appendage from the side.
Figure 43:
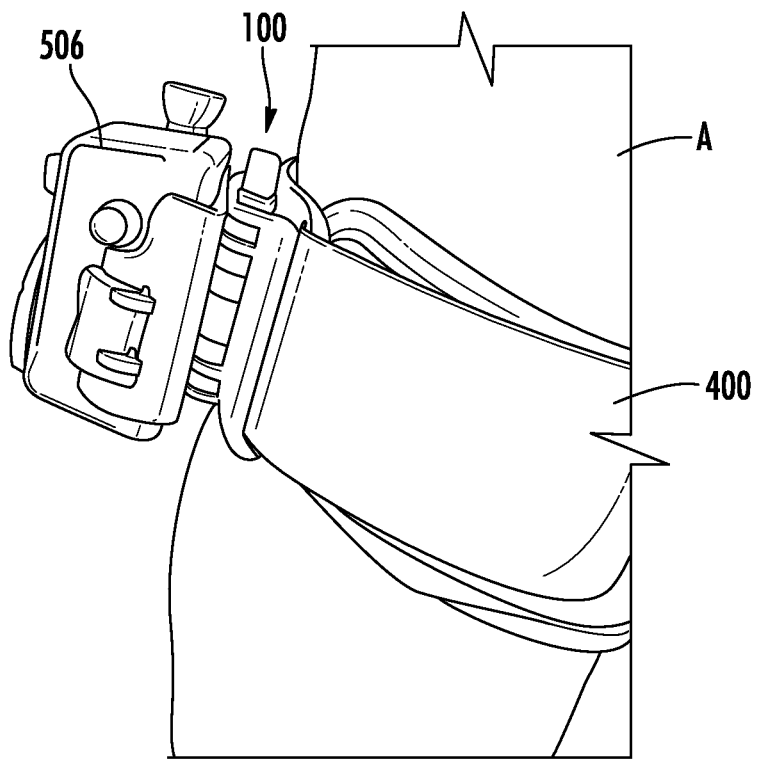
FIG. 43 depicts the transport assembly of FIG. 41 being worn on a wearer's appendage from the front.
Figure 44:
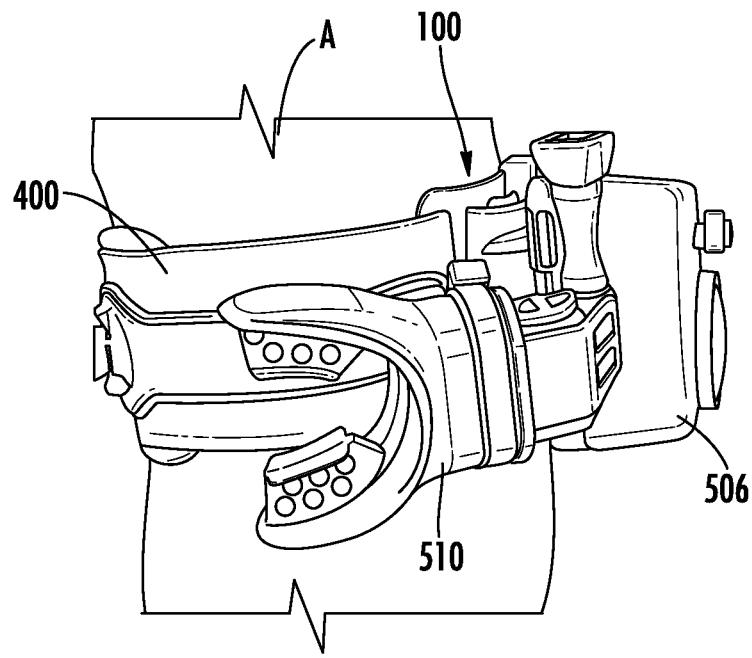
FIG. 44 depicts the transport assembly of FIG. 41 being worn on a wearer's appendage from the side to show the position of the mouthpiece.
Figure 45:
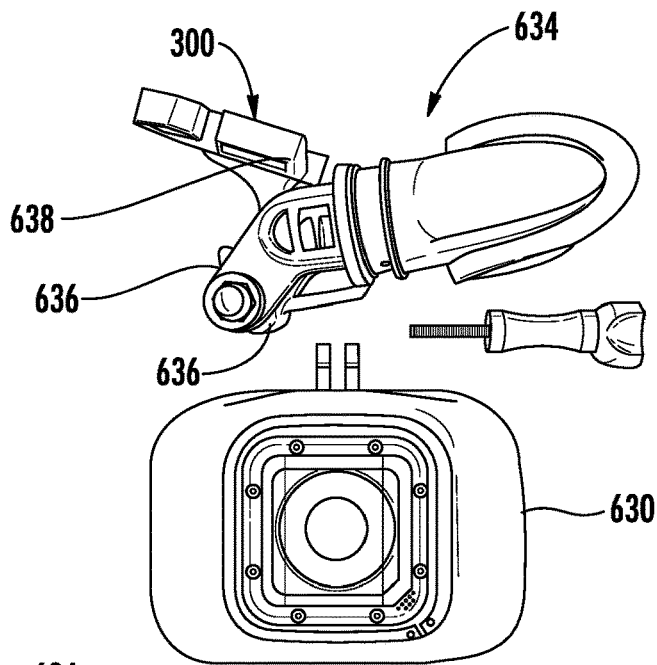
FIG. 45 is a side view of a second example of an object attachment member adapted for use with a mouthpiece and a camera with the camera detached.
Figure 46:
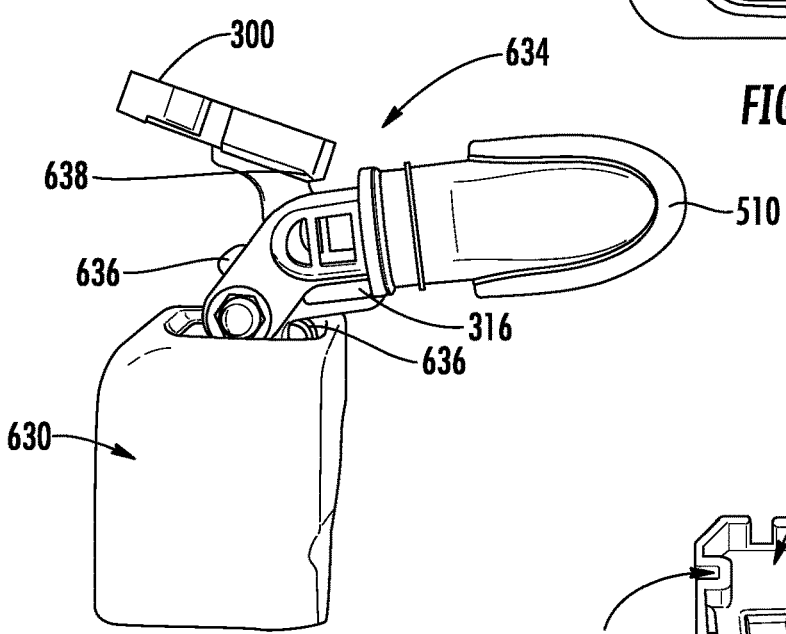
FIG. 46 is a side view of the object attachment member of FIG. 45 with the camera attached.
Figure 47:
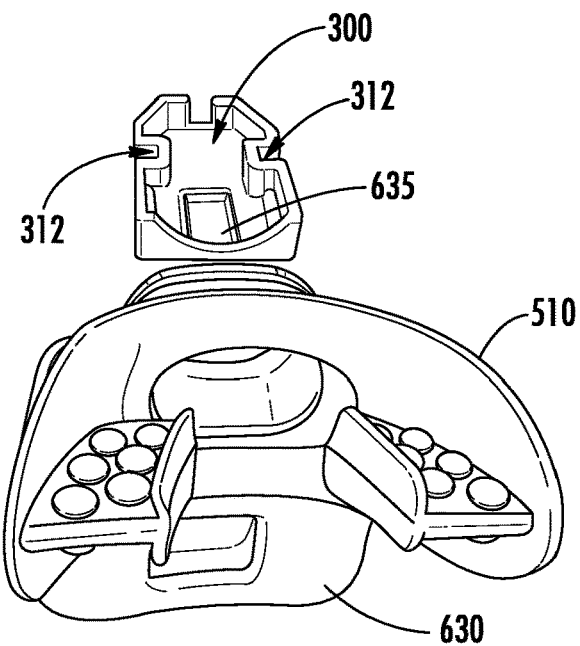
FIG. 47 is a top view of the object attachment member of FIG. 45 with the camera attached.

Referring to FIGS. 35 and 36, the object attachment member 300 is attached to the back side of a pouch 504 and is being carried on the wearer's appendage A.

Referring to FIGS. 37 and 38, an example of the transport assembly 100 is adapted for carrying a camera in a camera housing 506, whereby the object attachment member 300 is affixed to the back of the camera housing 506.

Referring to FIGS. 39-44, an example of the transport assembly 100 is adapted for carrying a camera in a waterproof camera housing 506 with a conventional mouthpiece attachment 510. In this embodiment, the transport assembly 100, when attached to the strap 400 worn on the wearer's appendage A, is designed to allow the waterproof camera housing 506 to face forward and the mouthpiece attachment 510 to wrap around the backside of the wearer's appendage A to minimize drag in the water. Conversely, the mouthpiece attachment 510 may also face forward if desired by the wearer.

Referring to FIGS. 45-48, an example of the transport assembly 100 is adapted for carrying a camera 630, including a mouthpiece attachment 510 to which the object attachment member 300 is connected by manufacturing the object attachment member 300 into the mouthpiece attachment 510. This enhanced mouthpiece attachment is hereinafter defined as a mouthpiece mount 634 and is specifically constructed to connect to the body attachment member 200.

The mouthpiece mount 634 may attach to any conventional strap such as strap 400 and be worn, for example, on either leg or arm with the same functionality. This example of the object attachment member 300 can be inserted into and removed from the body attachment member 200 from one direction. A stop 638 is built into the object attachment member 300 at the opposite end so that the wearer intuitively understands the correct direction from which to remove the mouthpiece mount 634 from the body attachment member 200 when doing so with one hand.

This configuration also allows the opposite end of the object attachment member 300 that points toward the wearer's face to (i) slope towards the mouthpiece attachment 510 at a downwards angle and (ii) to be scooped out and moved back away from the wearer's face (via a scooped nose 635) so that the object attachment member 300 cannot hit the wearer's face while carrying the mouthpiece mount 634 in the wearer's mouth in the event of a fall or wipeout.

In addition, the mouthpiece mount 634 includes two bump stops 636 that ensure the mouthpiece mount 634, including the object attachment member 300, cannot hit the camera 630. The first bump stop 636 is located under the tether attachment point 316 on the bottom of the mouthpiece mount 634 (away from the wearer's face). This first bump stop 636 ensures that the mouthpiece mount 634 cannot impact the top of the camera 630 while the wearer is carrying the mouthpiece mount 634 in his or her mouth. The second bump stop 636 is located on the mouthpiece attachment 510 under the object attachment member 300. This second bump stop 636 ensures that the object attachment member 300 cannot hit the camera 630 when the camera 630 is wrapped around the back of the wearer's leg or in the event of a wipeout.

Figure 48:
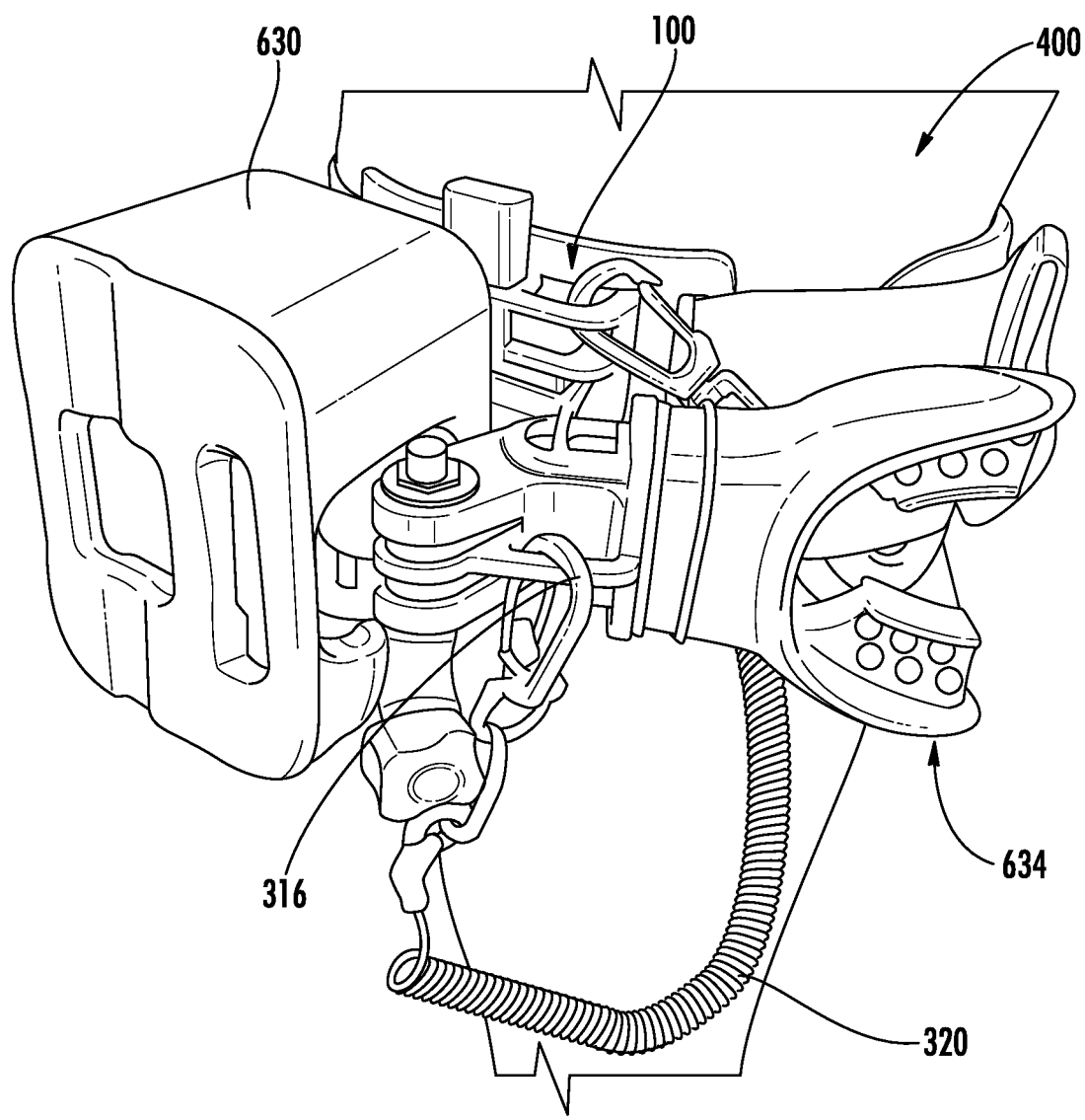
FIG. 48 is a side view of the object attachment member of FIG. 45 being worn on a wearer's appendage.
Figure 54:
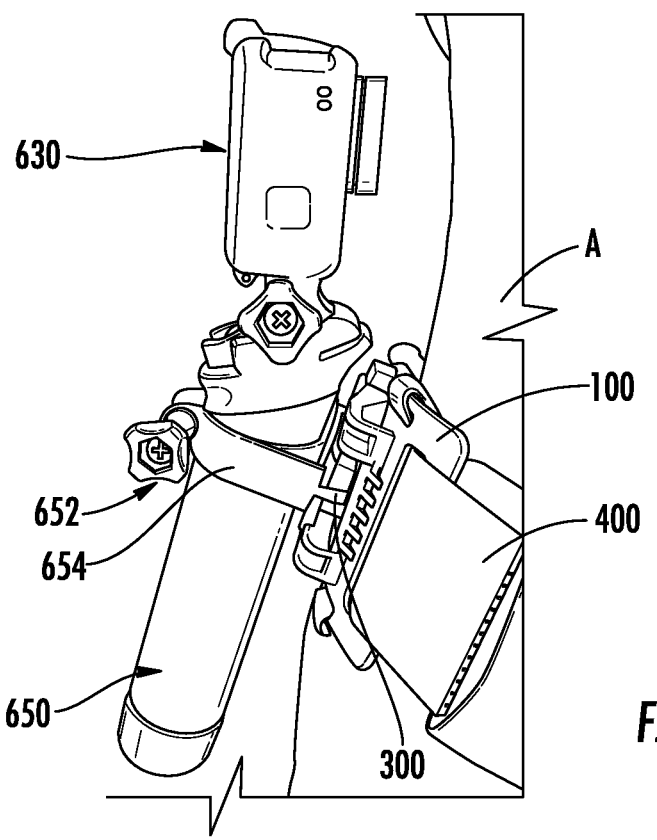
FIG. 54 is a side view of a wearer's appendage carrying a cylindrical buoy attached to a camera.
Figure 55:
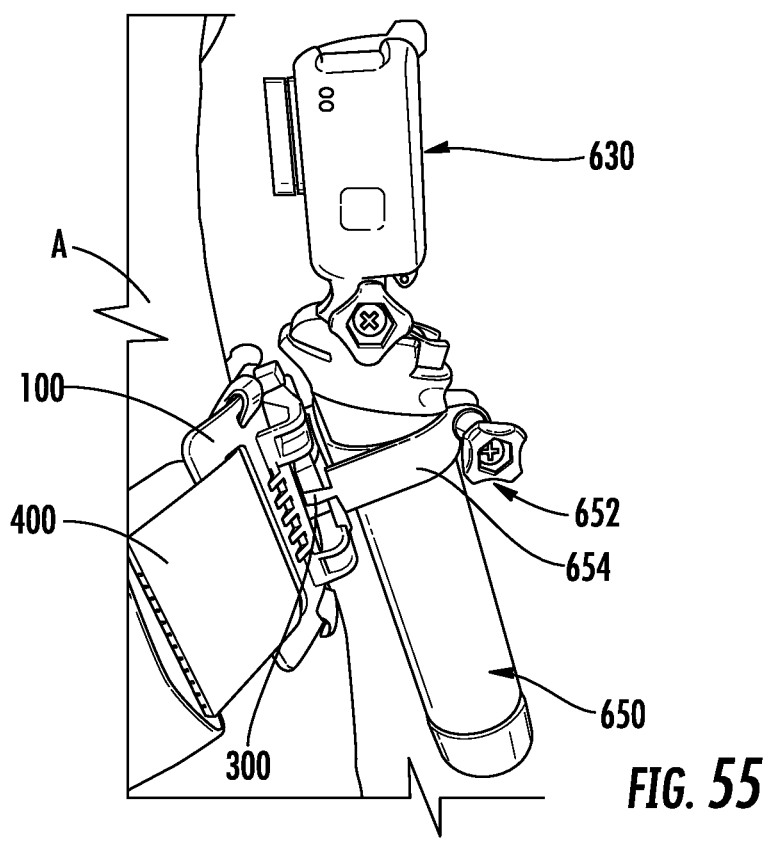
FIG. 55 is an opposing side view thereof.

The mouthpiece mount 634 is configured in a manner that allows the portion of the mouthpiece mount 634 that is carried in the wearer's mouth to face forward when worn on a strap 400 on the outside of the wearers' leg as shown in FIG. 48. As such, in the event of a wipeout while the camera 630 and mouthpiece mount 634 are being transported on a strap 400 on the wearer's leg or arm, it is the portion of the mouthpiece mount 634 that may impact the wearer's equipment (e.g. surfboard), thereby minimizing damage to the wearer's equipment and to the mouthpiece mount 634 itself. This configuration also allows the camera 630 to be positioned at an angle behind the wearer's leg or arm when transported on a strap 400 (see FIG. 48), which both better protects the camera 630 and minimizes overall drag of the mouthpiece mount 634 and the camera 630 when being transported in the water. Notwithstanding the foregoing, in other applications the mouthpiece mount 634 may be positioned towards the back of the wearer's arm or leg and the camera 630 positioned forward if so desired by the wearer.

The examples in FIGS. 45-48 depict the camera 630 contained in a float that wraps around all sides of the camera housing. The mouthpiece mount 634 also works in applications where the camera housing is not contained in a float and applications where a float is attached to the back of the camera housing (commonly known as a floaty backdoor).

Referring to FIGS. 49-55, another example of the transport assembly 100 is adapted for carrying a cylindrical object such as a camera buoy grip 650 (including a camera hand grip or pole). As background, a camera housing may be attached to the top of a buoy grip 650, and the wearer manipulates the camera location and direction by carrying the buoy grip 650, which floats, in his or her hand.

This example of this transport assembly 100, defined as the cylinder mount 652, is created by manufacturing the object attachment member 300 into the point where two cylindrically-shaped arms 654 attach. The arms 654 extend around the object to be transported and secure to the object via a cylinder locking mechanism 656, such as a screw, clasp, or the like on the side of the object opposite to where the object attachment member 300 is located. The wearer may transport the cylindrically shaped object by inserting the object attachment member 300 into the body attachment member 200 attached to a strap 400 worn around the wearer's appendage like other examples herein.

If desired, hinges may be included in the arms 654 near where the object attachment member 300 resides. The hinges can be used to create a larger opening angle such that the arms 654 can extend around different sizes of cylindrically-shaped objects.

Figure 56:
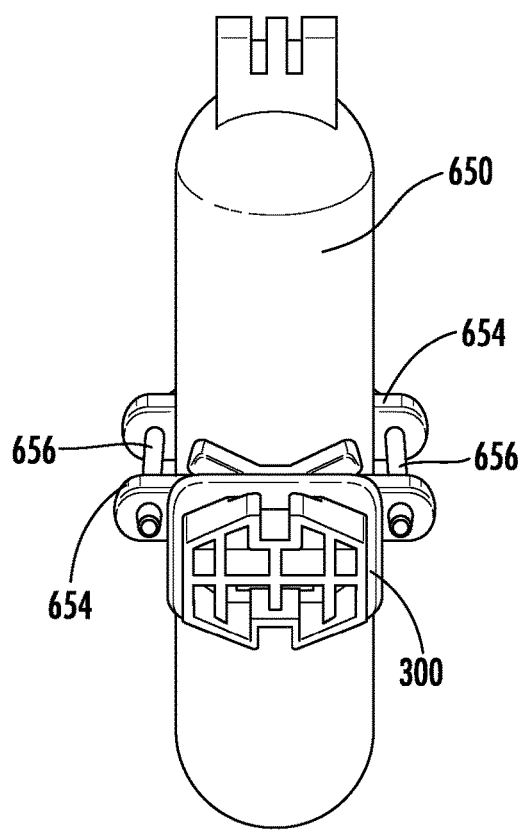
FIG. 56 is a back view of a fourth example of an object attachment member, which is adapted to be attached to a cylindrical object.
Figure 57:
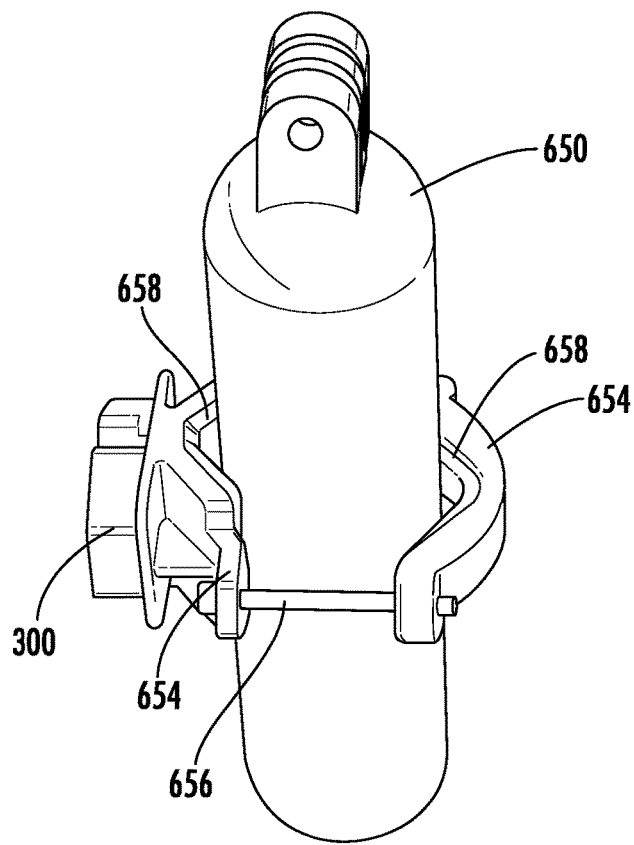
FIG. 57 is a side view thereof.

Referring to FIGS. 56 and 57, the cylindrically-shaded arms 654 may be separated and secured to one another around the cylindrical object via two attachment cylinder locking mechanisms 656 such as two screws or the like. Separation of the arms 654 allows the cylinder mount 652 to better secure around buoy grips 650 of varying sizes. In addition, a grip enhancing substance 658 such as rubber, santoprene, or the like may be inserted in the inside of the cylindrically-shaped arms 654 to better secure the cylindrically shaped arms to the buoy grip 650.

Referring to FIGS. 58-65, another example of the transport assembly 100 is adapted for carrying any object that includes or can be attach to a bracket reciprocally shaped to meld with a standard bracket portion of the transport assembly 100. By way of example, water camera accessories (e.g. housings, grips, etc.) may attach to objects via a cylindrically shaped bracket like the one that exists at the top of the conventional buoy grip 650 depicted in FIGS. 49-57. This version of the transport system, defined as the bracket mount 660, includes one or more standard cylindrically-shaped brackets that are manufactured into the object attachment member 300. The object to be transported that includes the mating bracket to the standard bracket portion of the bracket mount 660 is attached to the bracket mount 660 that includes the object attachment member 300. The object attachment member 300 is then inserted into the body attachment member 200 that is attached to a strap 400 worn around the wearer's appendage like other examples herein.

Figure 58:
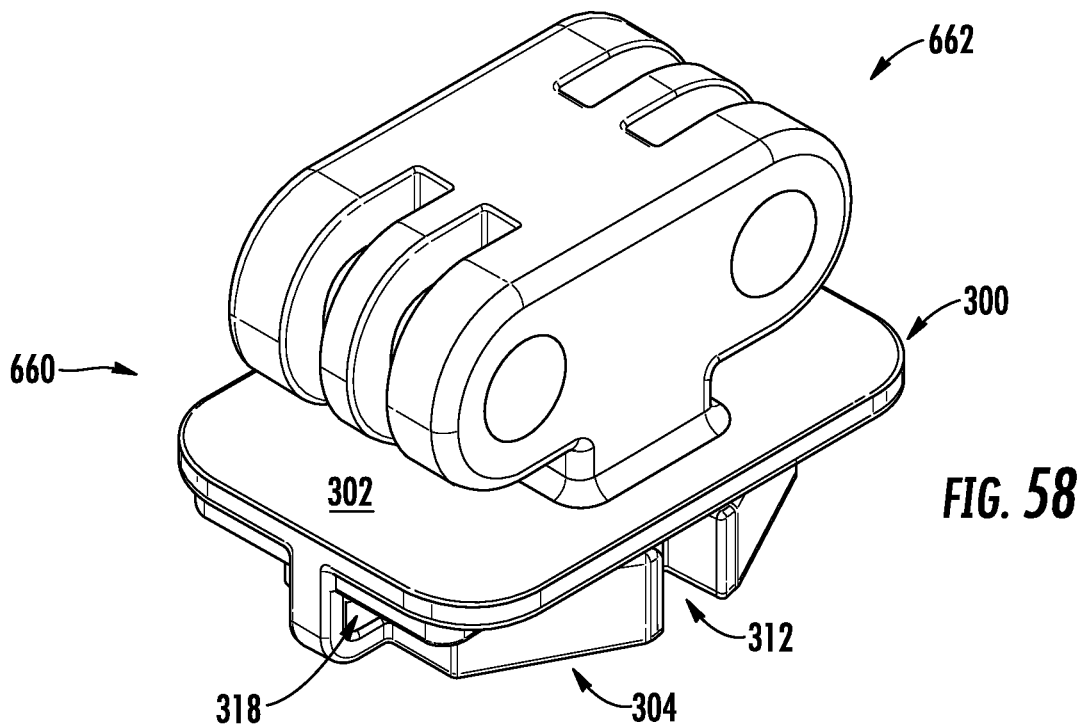
FIG. 58 is a perspective view of a fifth example of an object attachment member.
Figure 59:
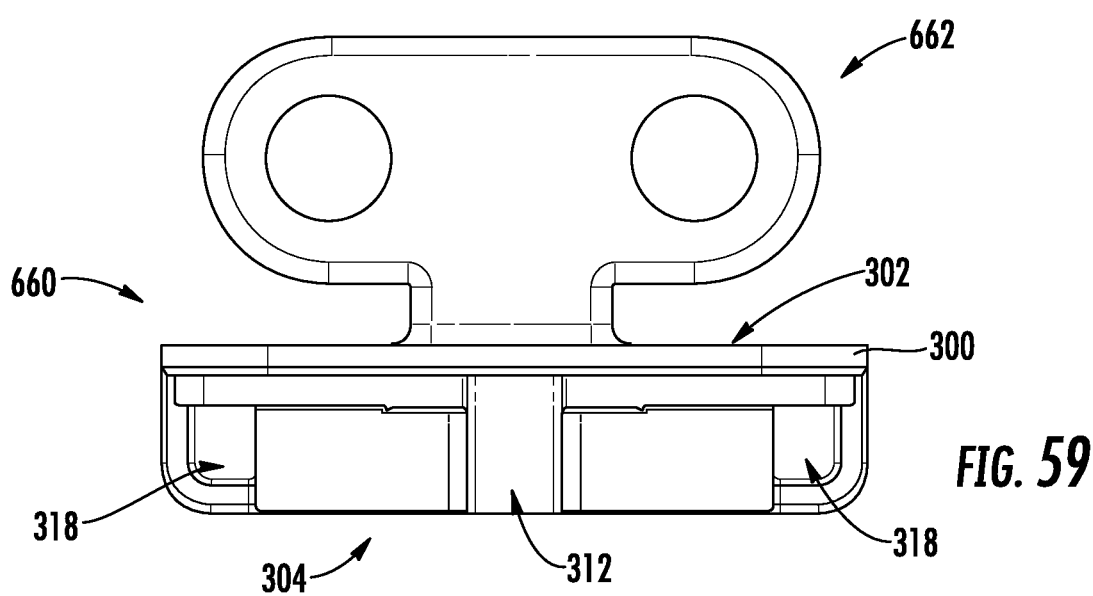
FIG. 59 is a side view thereof.

FIGS. 58 and 59 illustrate an example of the bracket mount 660 that can transport two objects simultaneously (e.g. two water cameras), as this version of the transport assembly 100 employs a standard, t-shaped double bracket 662 that is manufactured into the object attachment member 300.

Figure 60:
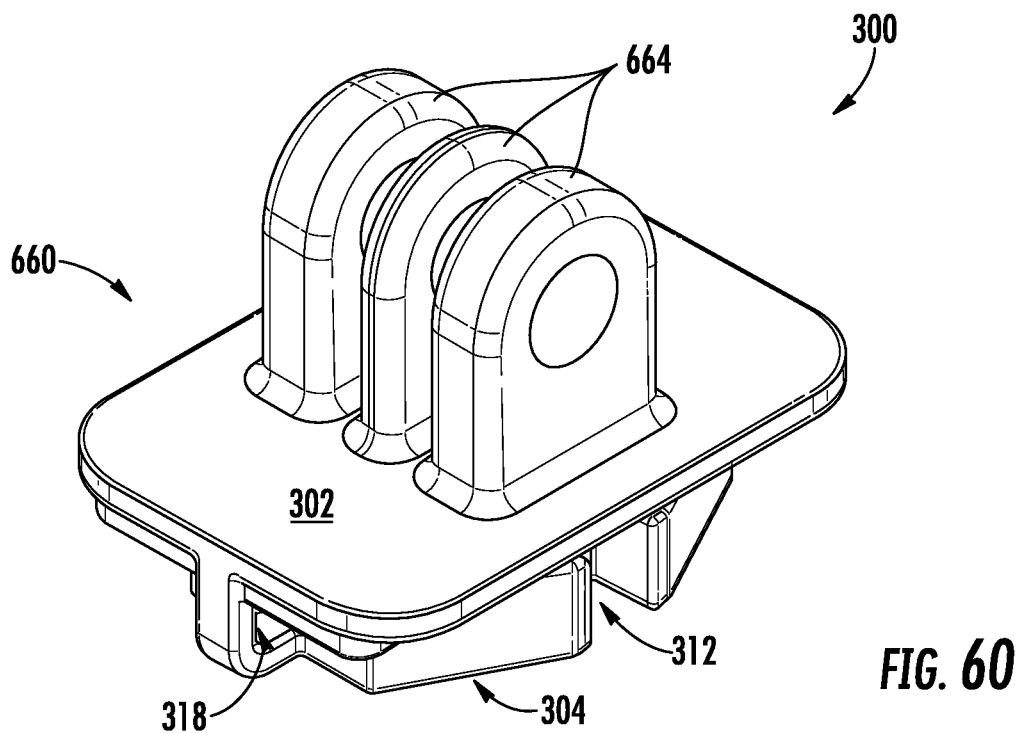
FIG. 60 is a perspective view of a sixth example of an object attachment member.
Figure 61:
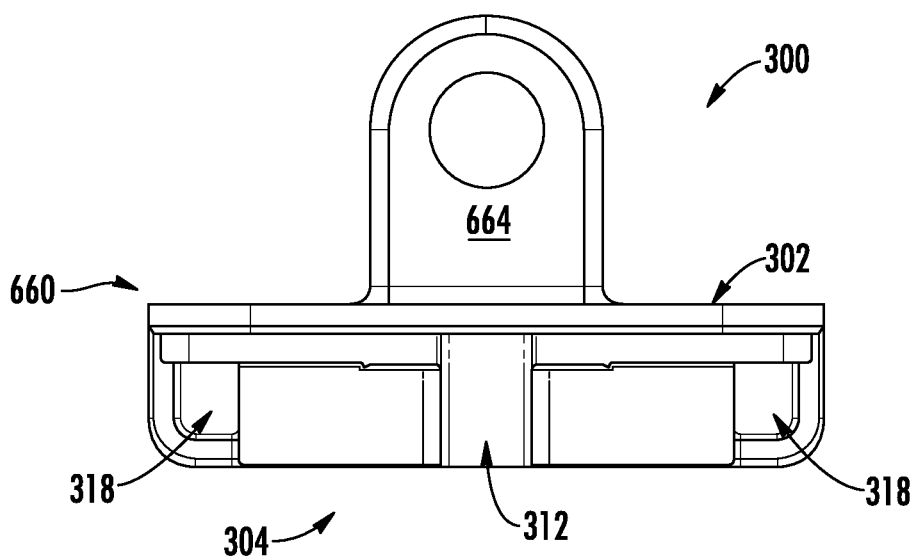
FIG. 61 is a side view thereof.

In FIGS. 60 and 61 is an example of the bracket mount 660 that can transport one object, as this version of the transport assembly 100 employs a standard single bracket 664 like the single bracket that exists at the top of the buoy grip 650 depicted in FIGS. 49-57 that is manufactured into the object attachment member 300.

Figure 62:
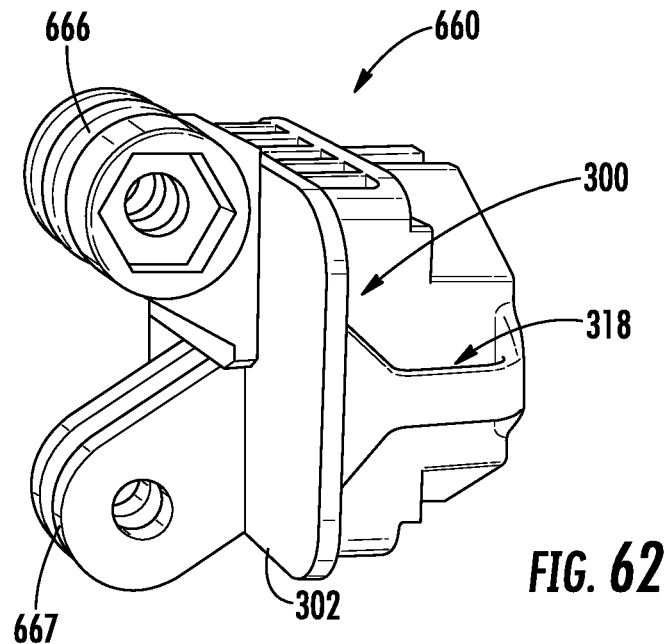
FIG. 62 is a side view of a seventh example of an object attachment member.
Figure 63:
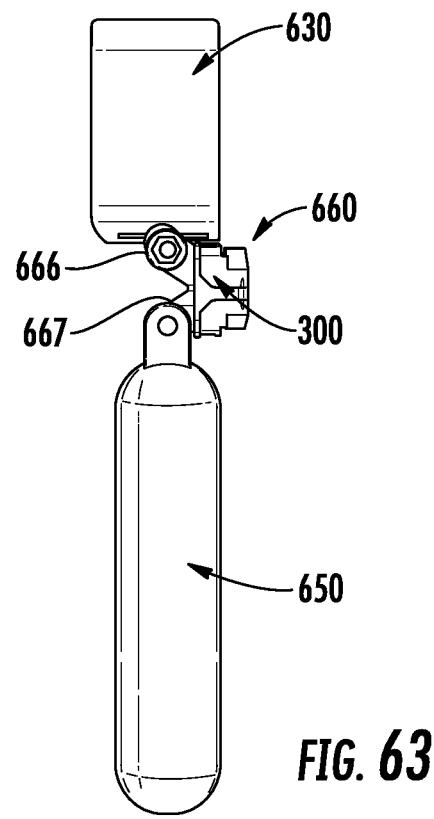
FIG. 63 is a side view of the object attachment member of FIG. 62 connected to a buoy and a camera.

In FIGS. 62 and 63 is an example of a bracket mount 600 that can transport two objects that normally attach to one another (e.g. a buoy grip 650 attached to a camera 630). This mating configuration requires that the bracket mount 660 contains a single bracket 666 with three prongs that connects to any object containing two prongs (like a camera 630), and also contains a single bracket 667 with two prongs that connects to any object containing three prongs (like a buoy grip 650). In this manner, the bracket mount 660 now resides between the two objects such that the bracket mount 660 does not have to be secured to the back of the camera housing so that the wearer can view the screen contained on the back of camera 630 when filming with cameras 630 that include a screen.

Figure 64:
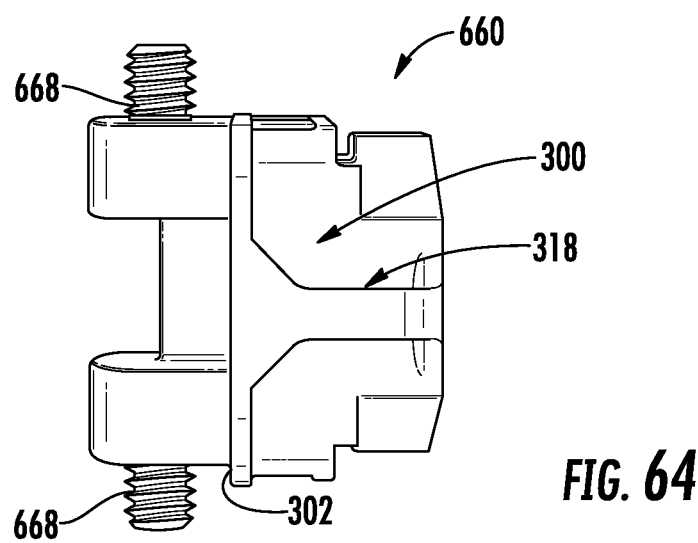
FIG. 64 is a side view of an eighth example of an object attachment member.
Figure 65:
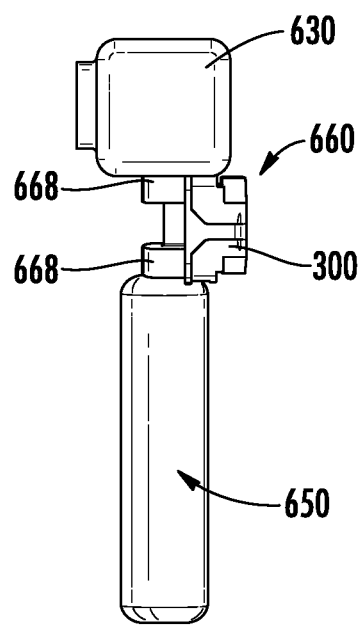
FIG. 65 is a side view of the object attachment member of FIG. 64 connected to a buoy and a camera.

In FIGS. 64 and 65 is an example of a bracket mount 660 that acts in a similar fashion as the one illustrated in FIGS. 62 and 63, whereby the bracket mount 660 resides between two objects (e.g. camera 630 with a screen and buoy grip 650), but where the bracket mount 660 connects to both the camera housing 630 and buoy grip 650, for example, via two male threaded posts 668 incorporated into the bracket mount 660 and that extend above and below the top and bottom edge of the bracket mount 660, respectively. Other bracket mount 660 variations might include a bracket mount that only contains only one threaded post 668 or one threaded post 668 combined with one single bracket 666 or 667.

Figure 81:
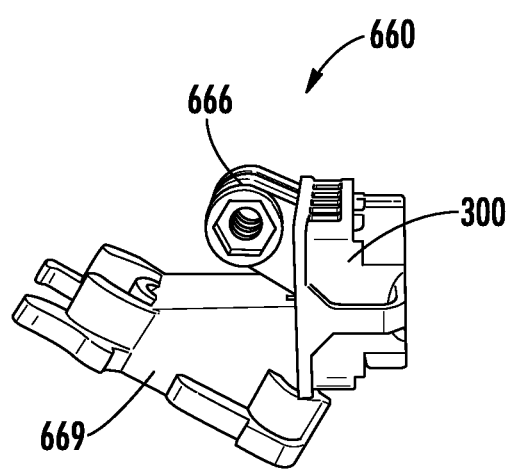
FIG. 81 is a side view of an example of a bracket mount.
Figure 82:
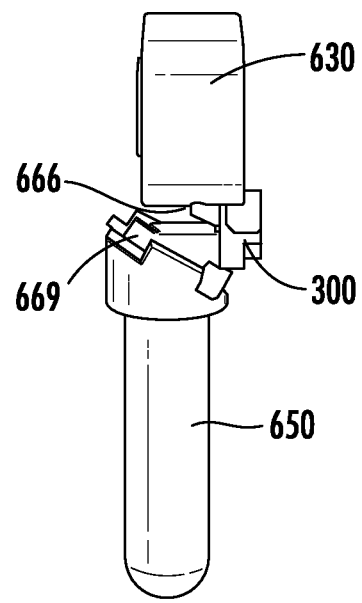
FIG. 82 is another side view thereof including a buoy grip and a camera.

Another example of a bracket mount 660 is presented in FIGS. 81 and 82 that also acts in a similar fashion to the ones presented in FIGS. 62 through 65, whereby it resides between two objects (e.g. camera 630 with a screen and buoy grip 650), but where the bracket mount 660 includes a single bracket 666 with three prongs that connects to any object containing two prongs (such as a camera 630), and where the bracket mount 660 also includes a buckle clip 669 that acts as the male insert clip for locking mechanisms used in certain applications.

Figure 66:
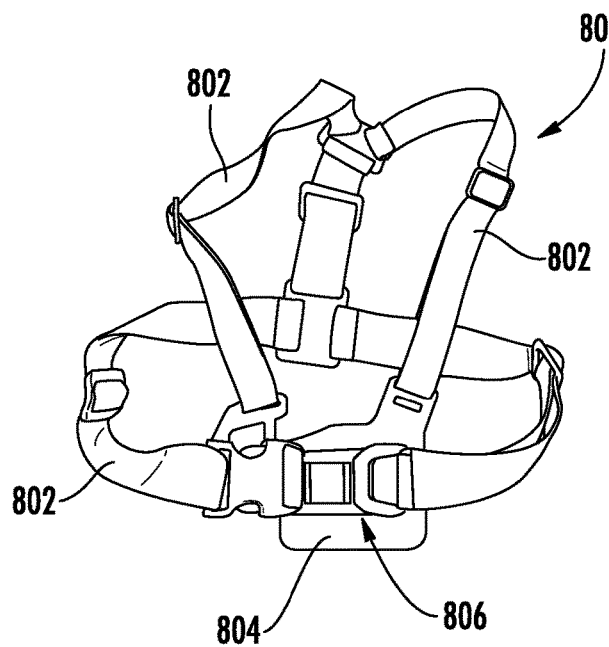
FIG. 66 is a front view of an example of a chest mount.

Referring to FIGS. 66-75 another example of a transport assembly 100 that includes another example of a body attachment member 200 designed to secure to the camera attachment built into the front plate of a conventional chest mount. A conventional chest mount 800 is illustrated in FIG. 66 and includes straps 802 that fit around a wearer's upper torso. A plate 804 carries the receiving female clip 806 of a camera attachment is affixed to the torso straps 802 in the front bottom middle of the chest mount 800.

Conversely, this example of a body attachment member 200 can be built into a chest mount 800 whereby the body attachment member 200 is secured directly to the torso straps 802 such that the front plate 804 is not needed and the body attachment member 200 acts as the front plate of the chest mount 800.

The following discussion applies when the body attachment member 200 is secured to the front plate 804 of the chest mount 800. The wearer will typically secure his or her camera housing 630 to the front plate 804 of the standard chest mount from which to film. The problem that this creates is that the wearer's torso is many times positioned at an angle away from the wearer's line of sight and direction in which the wearer is moving. This occurs in every watersport that requires the wearer to have one foot in front of the other whereby the wearer moves in the direction of the front foot (i.e. kiteboarding or windsurfing). Thus, the camera 630, when located on the wearer's chest, cannot not film where the wearer is heading or what the wearer sees.

While it is possible for the wearer to remove the camera housing 630 from the standard chest mount 800, doing so requires both hands and is generally not feasible while the wearer is engaged in the watersport. And even if it were feasible, once the camera 630 has been removed from the chest mount 800, the wearer must hold and direct the camera 630 in one of the wearer's hands, which severely hiders the wearer's ability to engage in the watersport.

The example of the body attachment member 200 in FIGS. 66-75 overcomes these problems. This example of the body attachment member 200 allows the wearer to carry his or her camera 630 with mouthpiece attachment 510 on the body attachment member 200 attached to a chest mount 800 when not filming and also film from that location if desired, while also allowing the wearer to quickly remove and replace the camera 630 from the body attachment member 200 with one hand at speed and then film from another location such as a mouthpiece attachment 510 that does not require use of the wearer's hands, while also positioning the camera 630 in the direction that the wearer is heading.

This flexibility to (i) store the camera 630 on the chest mount 800 when not filming, (ii) film from the chest mount 800 when desired, and also (iii) quickly remove and replace the camera 630 from the body attachment member 200 attached to the chest mount 800 with one hand without looking so as to film from another angle or location is important in certain, more active watersports (e.g. kiteboarding). Other unique features of this example of the body attachment member 200 are described below.

Figure 67:
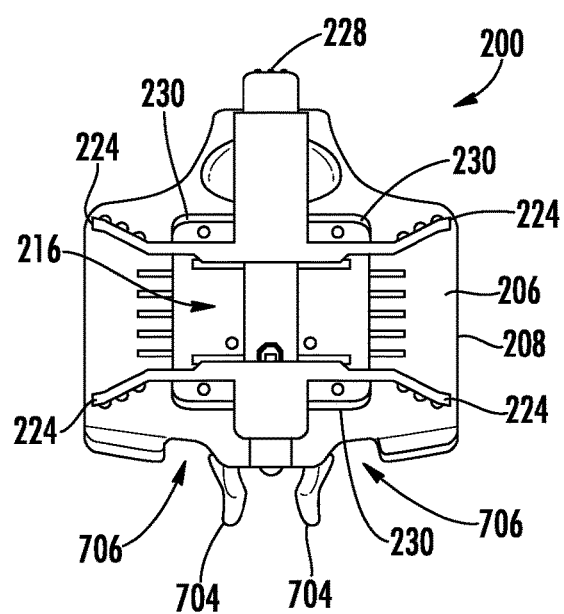
FIG. 67 is a front view of a fifth example of a body attachment member.

FIG. 67 presents the front side 206 of the body attachment member 200. In this embodiment, the height and width of the body attachment member 200 have been increased to better attach the first body attachment 200 to the front plate 804 of the chest mount 800.

Figure 68:
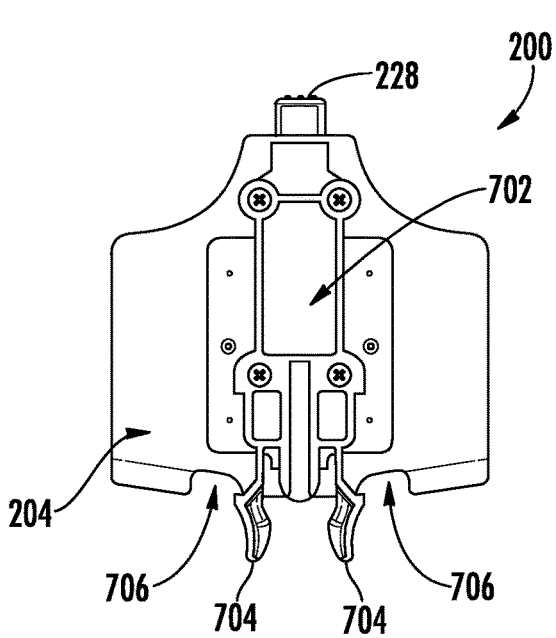
FIG. 68 is a back view thereof.

FIG. 68 presents the back side 204 of the body attachment member 200. The back side 206 includes a mating clip 702 that attaches the body attachment member 200 to the chest mount front plate 804. In this embodiment, the mating clip 702 is elongated such that it extends along most of the height of the back side 204 in order to better stabilize and secure the body attachment member 200 to the chest mount front plate 804. The bottom of the mating clip 702 is configured as a male insert clip used by several companies that connects to the front plate 804 of their standard chest mounts 800. The front plate 804 includes a mating female clip designed to receive the male clip.

Tongs 704 of the mating clip 702 are inserted into the top of the female clip on the front plate 804 of the chest mount 800. The tongs 704 then lock onto the bottom of the female clip, thereby securing the body attachment member 200 to the front plate 804.

Figure 69:
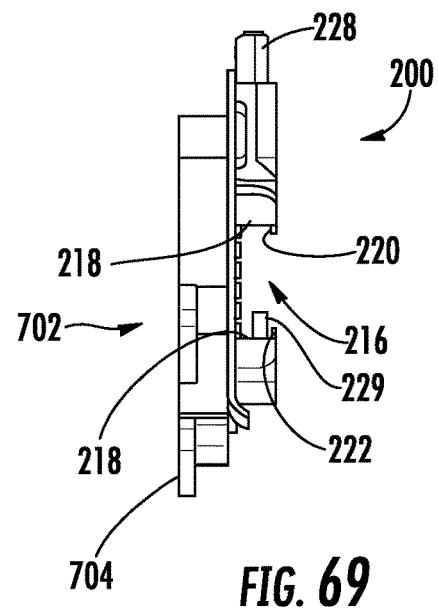
FIG. 69 is a side view thereof.
Figure 70:
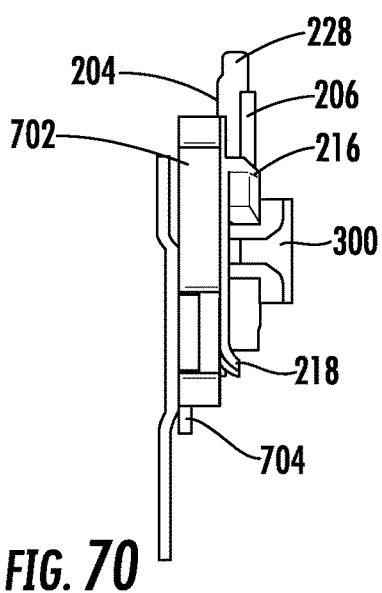
FIG. 70 is a side view thereof attached to the front plate of an example chest mount.

FIG. 69 is a side view of the body attachment member 200 before the mating clip 702 is inserted into the female clip on the front plate 804. FIG. 70 presents the same side view of the body attachment member 200 after the mating clip 702 has been inserted into the front plate 804 female clip such that the body attachment member 200 is attached to the front plate 804.

Figure 73:
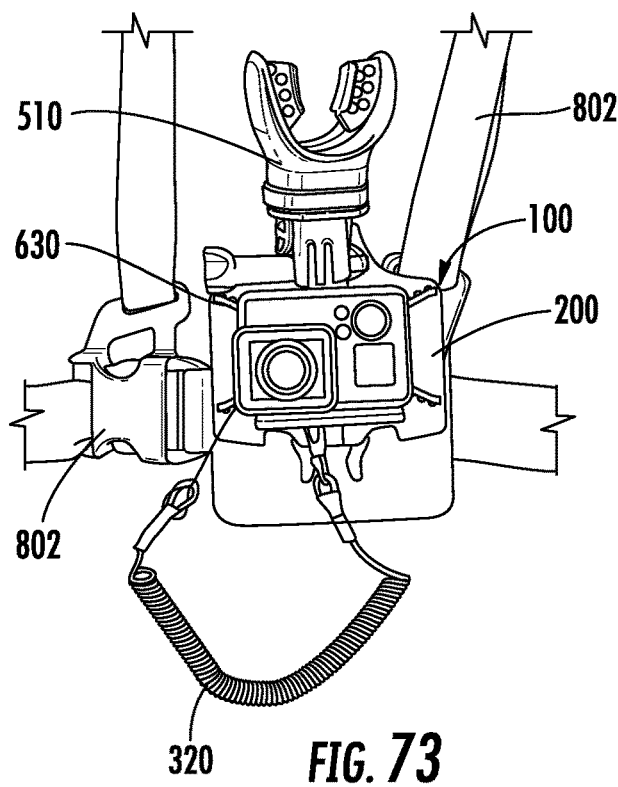
FIG. 73 is a front view of the camera attached to the body attachment member as in FIG. 72, which are both attached to a chest mount.
Figure 74:
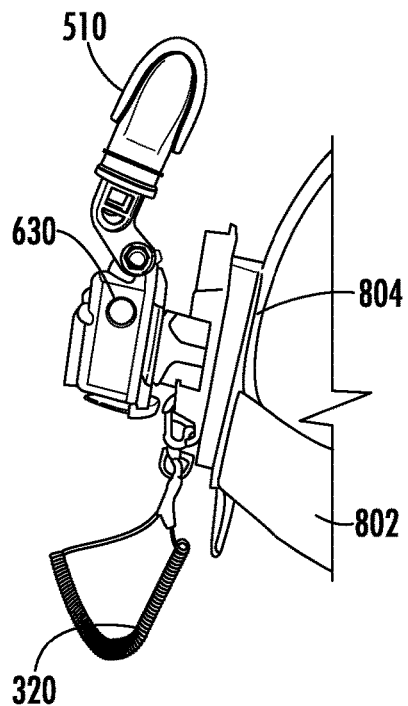
FIG. 74 is a side view thereof.

FIGS. 73 and 74 show the body attachment member 200 attached to the front plate of a chest mount 800. The body attachment member 200 resides directly in front of the front plate 804 of the chest mount 800 when the body attachment member 200 is attached to the front plate 804. As such, it may be desirable to incorporate indentations 706 (see FIGS. 67 and 68) into the bottom side of the body attachment member 200 so that the wearer can access the tongs 704 and press the tongs 704 together to remove the body attachment member 200 from the front plate 804 when desired.

Figure 71:
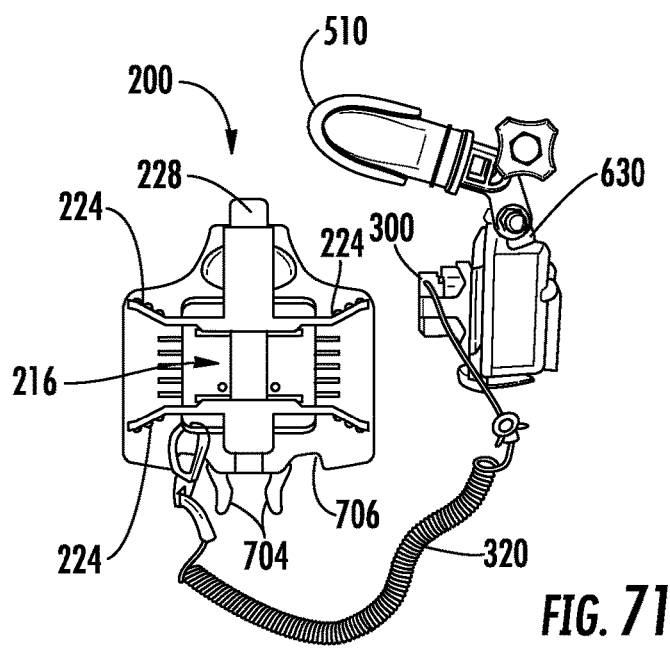
FIG. 71 depicts the body attachment member of FIG. 67 and an object attachment member affixed to the back of a camera ready to be connected thereto.

FIGS. 71-75 illustrate how a water camera 630 with mouthpiece attachment 510 may attach to and be removed from the body attachment member 200 when the body attachment member 200 is attached to the front plate 804. FIG. 71 depicts the water camera 630 with mouthpiece attachment 510 before the object attachment member 300 affixed to the back of the camera housing 506 is inserted into the channel 216 and secured to the body attachment 200. The mouthpiece attachment 510 in FIG. 71 is positioned horizontal to the top of the camera 630. It is in this position that the mouthpiece attachment 510 would reside when the wearer is carrying the camera 630 in his or her mouth via the mouthpiece attachment 510.

Figure 72:
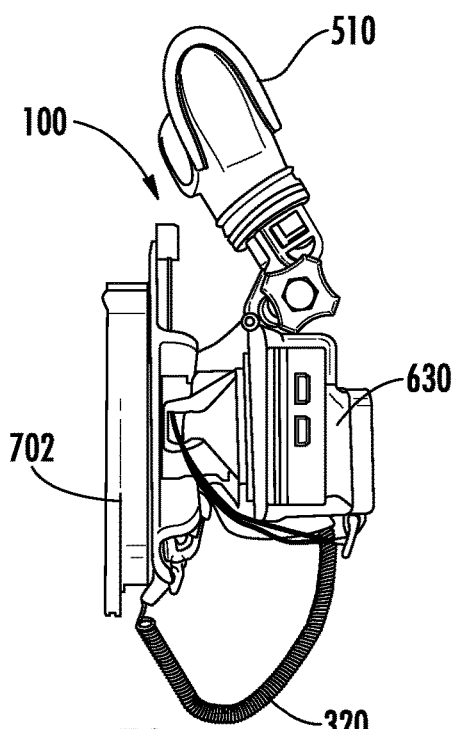
FIG. 72 is a side view thereof with the camera attached to the body attachment member.

FIG. 72 illustrates the object attachment member 300 inserted into the channel 216 of the body attachment member 200 such that the camera 630 and mouthpiece attachment 510 are attached to the body attachment member 200. The top of the mouthpiece attachment 510 is rotated up in FIG. 72, which is how the mouthpiece attachment 510 is positioned when the object attachment member 300 has been inserted into the channel 216 such that the camera 630 is attached to the body attachment member 200. Rotating the mouthpiece attachment 510 up is useful so that the mouthpiece attachment 510 does not impact the wearer's chest.

Figure 75:
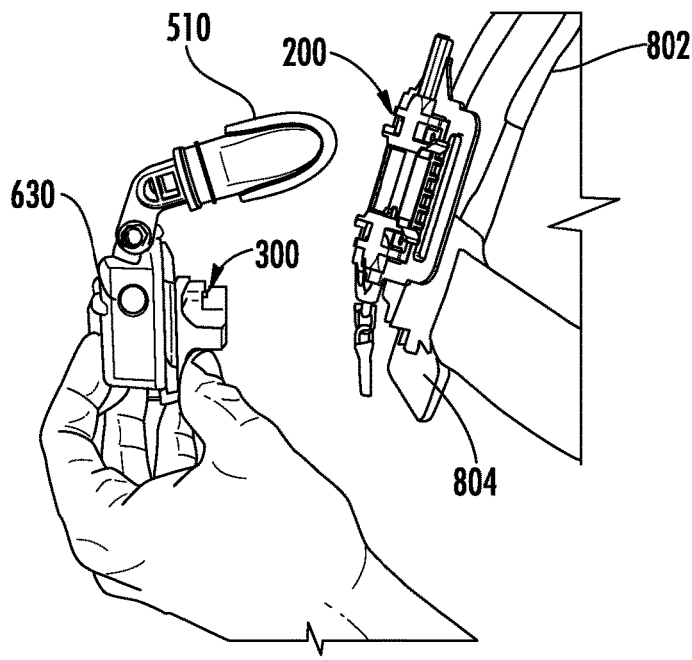
FIG. 75 is a side view thereof with the camera removed from the chest mount and being held by the wearer.

FIGS. 73-75 depict the body attachment member 200 attached to the front plate 804 of a chest mount 800 when the chest mount 800 is worn on the torso of the wearer. In FIGS. 73 and 74, the object attachment member 300 is inserted into the channel 216 of the body attachment member 200 such that the camera 630 with mouthpiece attachment 510 are attached to the body attachment member 200.

FIG. 75 depicts the object attachment member 300 removed from the channel 216 of the body attachment member 200 such that the camera 630 and mouthpiece attachment 510 reside in the wearer's hand. The wearer may place the mouthpiece attachment 510 in his or her mouth so as to transport the camera 630 and film from that location. The tether 320 attached to the body attachment member 200 and object attachment member 300 ensures that the camera 630 will not be lost should the wearer drop the camera 630.

To remove the camera 630 from the body attachment member 200, the wearer can grab the camera 630 with his or her fingers, push the actuator 228 with his or her thumb, and slide the object attachment member 300 out of the channel 216 of the body attachment member 200 using one hand. To reattach the camera 630 to the body attachment member 200, the wearer can slide the object attachment member 300 into the channel 216 until the locking pin 229 automatically engages with a notch 312.

As previously discussed, there are numerous methods in which the object attachment member 300 may be attached to the object to be transported. For example, the object attachment member 300 may be bonded to the item to be transported. In addition, the object attachment member 300 may be integrally constructed into a component of the object to be carried.

Figure 76:
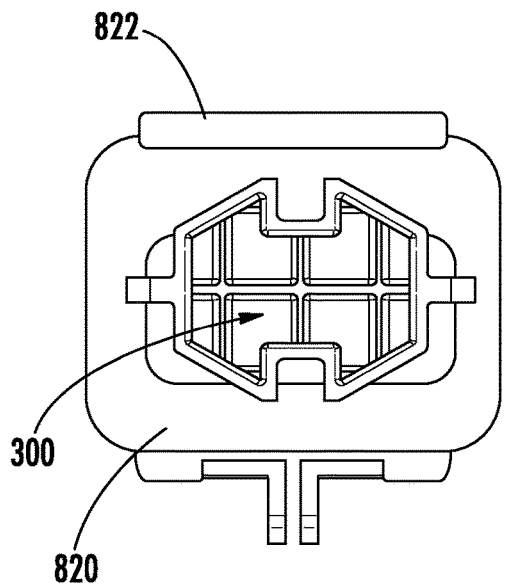
FIG. 76 is a back view of a camera door with an integrated object attachment member oriented horizontally.
Figure 77:
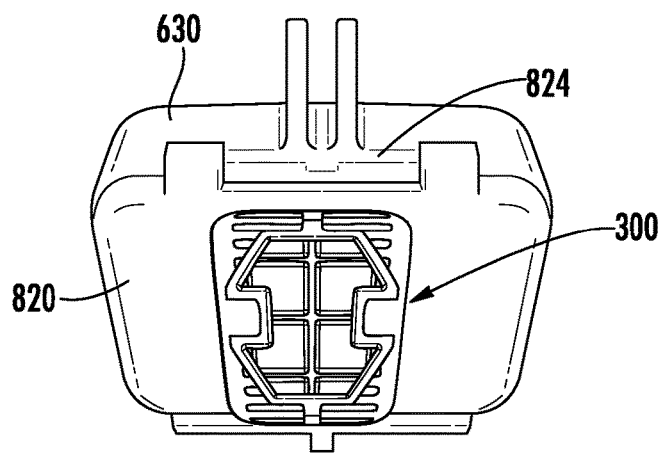
FIG. 77 is a back view of a camera having a door with an integrated object attachment member oriented vertically.

FIG. 76 is a back view of the object attachment member 300 built into a removable door 820 of a camera housing 506 whereby the object attachment member 300 is positioned horizontally on the door 820. In FIG. 77, the object attachment member 300 is positioned vertically on the door 820. In either case, the door 820 may include a locking member 822 for locking the door 820 closed and a connector member 824 that connect the door 820 to the camera 630.

In certain examples, it may not be desirable to bond the object attachment member 300 directly to the object to be transported, and it may not be possible to construct the object attachment member 300 into a component of the item to be transported. It these instances, it may be useful to build the object attachment member 300 into a mount specifically designed for the application.

Figure 78:
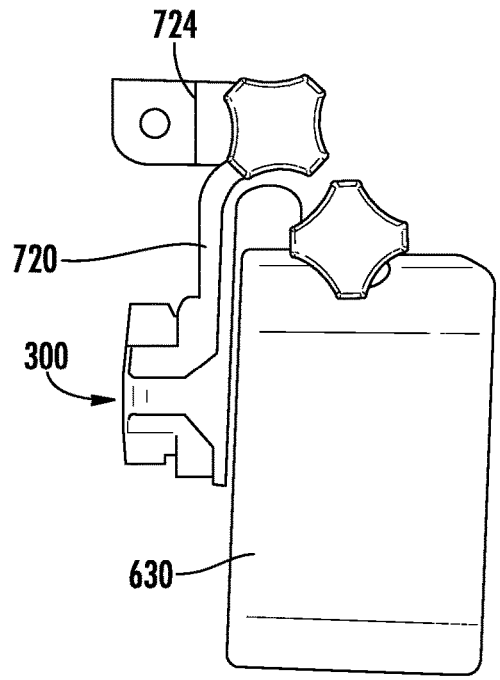
FIG. 78 is a side view of a ninth example of an object attachment member connected to a camera.
Figure 79:
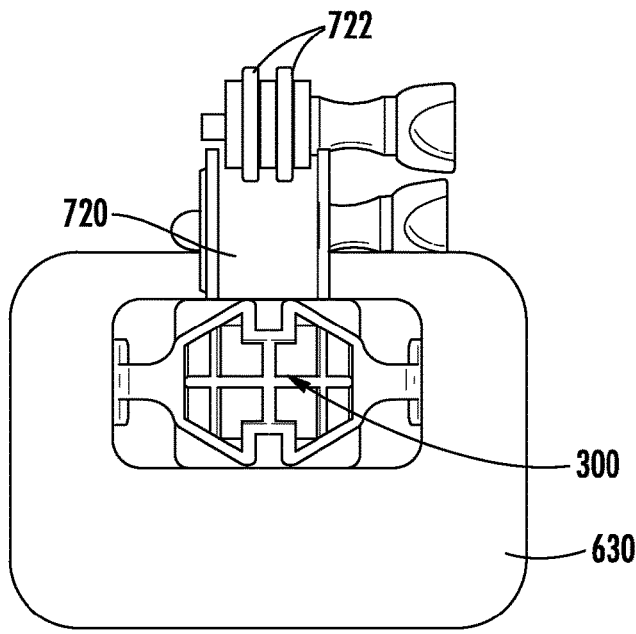
FIG. 79 is a back view thereof.

FIG. 78 is a side view whereby an L-bracket mount 720 is secured to the camera attachment posts of the camera 630 via a camera securing screw. The L-bracket mount 720 including the object attachment member 300 is positioned behind the camera 630 in this example. Since the L-bracket mount 720 is connected to the camera attachment posts that normally attach the camera 630 to another item such as a mouthpiece attachment 632, it may be desirable to build L-bracket connection posts 722 into the L-bracket mount 720.

FIG. 78 illustrates a conventional camera securing screw inserted through the L-bracket connection posts 722 that attaches an extension 724 to the L-bracket mount 720, as further discussed below. In certain embodiments, it may be desirable to attach an extension 724 to the L-bracket connection posts 722 so as to further distance the item to be attached to the L-bracket mount 720 from the L-bracket mount 720 containing the object attachment member 300 attached to the camera 630. One example of this need is to further distance a mouthpiece attachment 510 from the L-bracket mount 720 including the object attachment member 300 such that the object attachment member 300 will not impact the wearer's chin in the event of a wipeout or fall when the wearer is transporting the camera 630 in his or her mouth via a mouthpiece attachment 510.

Figure 80:
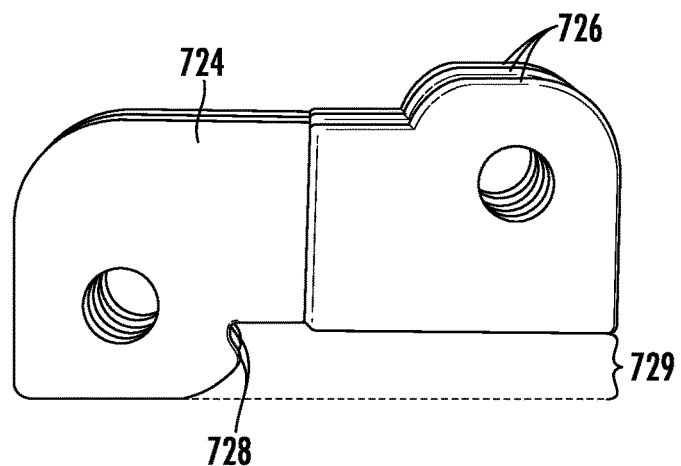
FIG. 80 is a side view of an example of an L-bracket.

In FIG. 80 is a modified version of the extension 724 that allows a mouthpiece attachment 510 connected to the extension 724 to not interfered with the operation of mouthpiece attachment 510 when the mouthpiece attachment 510 is used to secure the camera 630 to another mount such as a surfboard mount. In this example, the tri-post connection point 726 of the extension 724 connects to the L-bracket connection posts 722 of the L-bracket 720, and the bi-post connection point 728 of the extension 724 connects to the mouthpiece attachment 510. A gap 729 may exist so that the wearer can access a rubber stop connection mechanism that may be included in certain mouthpiece attachments 510 when the wearer connects the mouthpiece attachment 510 to another mount such as a surfboard mount.

The transport assembly may be made of any material suitable for use in activities such as watersports. Such materials include, but are not limited to, plastic, rubber, metal, composite material (e.g. nylon-glass), hook and loop fasteners, polypropylene webbing, neoprene, lycra, or the like.

The back side 204 of the body attachment member 200 depicted in the many of the examples is rounded to better contour to the appendage of a wearer. It should be understood, however, that the back side 204 may be any shape desired to conform to the object to which the body attachment member 200 is attached and the activity to be performed. Examples are a planar configuration when attaching the body attachment member 200 to a wearer's equipment, the front plate 804 of a chest mount 800, or the belt clip illustrated in FIGS. 28-30.

The dimensions of any or all components of the body attachment member 200 and object attachment member 300, and the placement of any or all components of the body attachment member 200 and object attachment member 300, may vary depending upon the configuration required for the activity chosen and the object to which the body attachment member 200 or object attachment member 300 may attach.

Although the hook portion and loop portion of a touch fastener are shown and described here as being in specific positions, it is to be understood that their relative positions may be reversed and that they may be located on any side of the body attachment member 200.

This disclosure has described examples of possible embodiments, but not all possible embodiments of the transport assembly 100 and it uses and component parts. The transport assembly 100, its uses and parts may be embodied in many different forms and should not be construed as limited to only the embodiments and features described above or claimed in the appended claims.

That which is claimed is:

1. An object transport assembly comprising:
a body attachment member adapted to attach to a wearer;
an object attachment member adapted to attached to an object to be transported;
an insert carried on one of the body attachment member or object attachment member, the insert forming a male portion of a dovetail joint, the insert including a notch formed therein;
an insert receiving channel carried on the other of the body attachment member or object attachment member and forming a female portion of a dovetail joint that mates with the insert, the insert receiving channel including a pin that is biased in such a way that the pin automatically slides into the notch when the insert mates with the insert receiving channel; and
an actuator operably connected to the pin, the actuator being operable to move the pin out of the notch for removal of the insert from the insert receiving channel;
wherein the insert receiving channel has at least one channel mouth through which the insert is receivable into the insert receiving channel, the channel mouth including channel guides that extend out of the insert receiving channel at the channel mouth and angle outwardly relative to channel walls forming the boundaries of the insert receiving channel to increase the internal distance between the channel walls at the channel mouth.

2. The object transport assembly of claim 1, wherein the insert includes opposed insert walls extending from a central section to opposed insert ends, the insert walls tapering inwardly toward the insert ends in such a way that a width of the insert at the insert ends is less than the width at the central section.

3. The object transport assembly of claim 1, wherein the body attachment member is adapted to attach to the wearer with a strap adapted to attach to an appendage of the wearer.

4. The object transport assembly of claim 1, wherein the object attachment member includes a mouthpiece.

5. The object transport assembly of claim 1, wherein the object attachment member includes at least one arm that connects a cylindrical object thereto.

6. The object transport assembly of claim 1, wherein:
the insert receiving channel has a pair of opposed channel mouths; and
the insert includes opposed insert walls extending from a central section to opposed insert ends, the insert walls tapering inwardly toward the insert ends in such a way that a width of the insert at the insert ends is less than the width at the central section.

7. An object transport assembly comprising:
an object attachment member adapted to attached to an object to be transported, the object attachment member carrying an insert that forms a male portion of a dovetail joint, the insert including a notch formed therein;
a body attachment member adapted to attach to a wearer, the body attachment member carrying an insert receiving channel that forms a female portion of a dovetail joint that mates with the insert, the insert receiving channel including a pin that is biased in such a way that the pin automatically slides into the notch when the insert mates with the insert receiving channel; and
an actuator operably connected to the pin and carried by the body attachment member, the actuator being operable to move the pin out of the notch for removal of the insert from the insert receiving channel;
wherein the insert receiving channel has at least one channel mouth through which the insert is receivable into the insert receiving channel, the channel mouth including channel guides that extend out of the insert receiving channel at the channel mouth and angle outwardly relative to channel walls forming the boundaries of the insert receiving channel to increase the internal distance between the channel walls at the channel mouth.

8. The object transport assembly of claim 7, wherein the insert includes opposed insert walls extending from a central section to opposed insert ends, the insert walls tapering inwardly toward the insert ends in such a way that a width of the insert at the insert ends is less than the width at the central section.

9. The object transport assembly of claim 7, wherein the body attachment member is adapted to attach to the wearer with a strap adapted to attach to an appendage of the wearer.

10. The object transport assembly of claim 7, wherein the object attachment member includes a mouthpiece.

11. The object transport assembly of claim 7, wherein the object attachment member includes at least one arm that connects a cylindrical object thereto.

12. The object transport assembly of claim 7, wherein:
the insert receiving channel has a pair of opposed channel mouths; and
the insert includes opposed insert walls extending from a central section to opposed insert ends, the insert walls tapering inwardly toward the insert ends in such a way that a width of the insert at the insert ends is less than the width at the central section.

13. A method comprising performing a watersport in a body of water while wearing an object transport assembly comprising a body attachment member adapted to attach to a wearer;
an object attachment member adapted to attached to an object to be transported;
an insert carried on one of the body attachment member or object attachment member, the insert forming a male portion of a dovetail joint, the insert including a notch formed therein;
an insert receiving channel carried on the other of the body attachment member or object attachment member and forming a female portion of a dovetail joint that mates with the insert, the insert receiving channel including a pin that is biased in such a way that the pin automatically slides into the notch when the insert mates with the insert receiving channel; and
an actuator operably connected to the pin, the actuator being operable to move the pin out of the notch for removal of the insert from the insert receiving channel.

14. The method of claim 13, wherein the insert receiving channel has a pair of opposed channel mouths through which the insert is receivable into the insert receiving channel, each channel mouth including channel guides that extend out of the insert receiving channel at the respective channel mouths and angle outwardly relative to channel walls forming the boundaries of the insert receiving channel to increase the internal distance between the channel walls at the channel mouths.

15. The method of claim 13, wherein the insert includes opposed insert walls extending from a central section to opposed insert ends, the insert walls tapering inwardly toward the insert ends in such a way that a width of the insert at the insert ends is less than the width at the central section.

16. The method of claim 13, wherein the body attachment member is adapted to attach to the wearer with a strap adapted to attach to an appendage of the wearer.

17. The method of claim 13, wherein the object attachment member includes a mouthpiece.

18. The method of claim 13, wherein the object attachment member includes at least one arm that connects a cylindrical object thereto.

19. The method of claim 13, wherein:
the insert receiving channel has a pair of opposed channel mouths through which the insert is receivable into the insert receiving channel, each channel mouth including channel guides that extend out of the insert receiving channel at the respective channel mouths and angle outwardly relative to channel walls forming the boundaries of the insert receiving channel to increase the internal distance between the channel walls at the channel mouths; and
the insert includes opposed insert walls extending from a central section to opposed insert ends, the insert walls tapering inwardly toward the insert ends in such a way that a width of the insert at the insert ends is less than the width at the central section.

* * * * *